United States Patent [19]

Yokoi et al.

[11] Patent Number: 5,280,552
[45] Date of Patent: Jan. 18, 1994

[54] METAL TUBE CLAD OPTICAL FIBER CABLE

[75] Inventors: Kiyomi Yokoi, Kashiwashi; Kazufumi Tabata, Yachiyoshi; Yoshiro Takamatsu, Sakurashi, all of Japan

[73] Assignee: Nippon Steel Welding Products & Engineering Co., Ltd.

[21] Appl. No.: 909,017

[22] Filed: Jul. 6, 1992

[30] Foreign Application Priority Data

| Jul. 5, 1991 | [JP] | Japan | 3-165526 |
| Jul. 5, 1991 | [JP] | Japan | 3-165527 |
| Jul. 5, 1991 | [JP] | Japan | 3-165528 |
| Nov. 22, 1991 | [JP] | Japan | 3-307414 |
| May 19, 1992 | [JP] | Japan | 4-126430 |

[51] Int. Cl.$^5$ .................................. G02B 6/44
[52] U.S. Cl. ................................ 385/78; 385/69
[58] Field of Search ............ 385/78, 103, 107, 113, 385/69

[56] References Cited

U.S. PATENT DOCUMENTS 4,168,109 9/1979 Dumire .......................... 385/69
5,214,731 5/1993 Chang ............................ 385/69

Primary Examiner—Rodney B. Bovernick
Assistant Examiner—Robert E. Wise
Attorney, Agent, or Firm—Sughrue, Mion, Zinn, Macpeak & Seas

[57] ABSTRACT

A connector for connecting an optical fiber cable to an equipment adaptor, a flexible metal tube clad optical fiber cable including a flexible metal tube through which an optical fiber core rod extends and which is used for connection with an equipment, a relay adaptor for providing a connection between cables of different kinds, and a seamless metal tube clad optical fiber cable including a seamless tube through which an optical fiber core rod extends and which is used for wiring over a relatively long distance are disclosed individually and in combinations. The connector is connected to the flexible metal tube clad optical fiber cable, which is then connected through the relay adaptor to the seamless metal tube clad optical fiber cable. A certain element of the connector is formed of an insulator to provide an electrical isolation between the metal tube and the equipment adaptor.

24 Claims, 26 Drawing Sheets

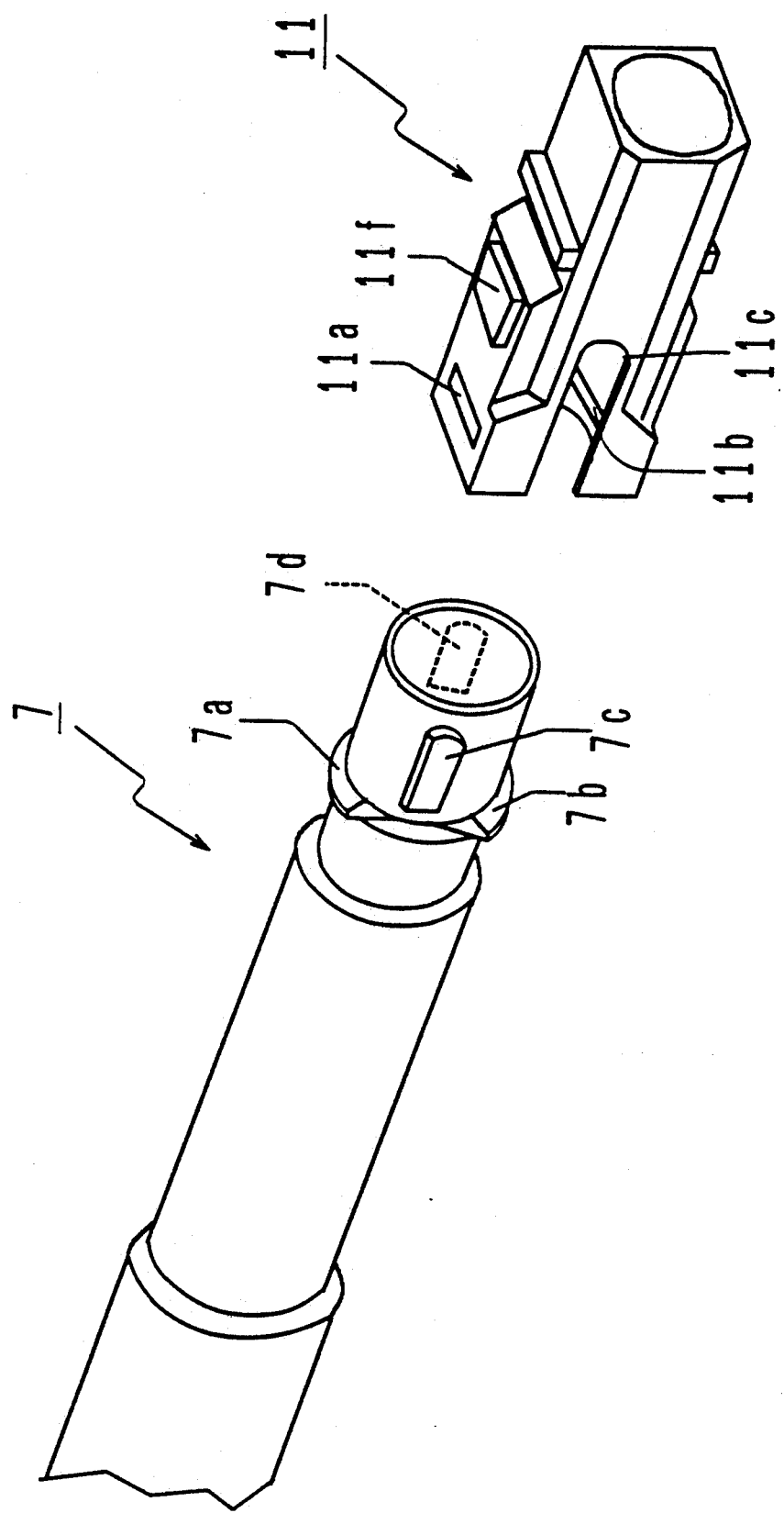

Proir art

Proir art

Proir art

Proir art

METAL TUBE CLAD OPTICAL FIBER CABLE

FIELD OF THE INVENTION

The invention relates to an optical fiber cable having a metal tube through which an optical fiber core wire extends, and in particular, to a metal tube clad optical fiber cable having a connector at its end for connection with another optical fiber cable or optical communication equipment.

RELATED APPLICATIONS

The invention disclosed and claimed herein is related to the subject matter of the following patent applications:

| Country | Filing Date | Application No. | Laid-Open No. | Laid-Open Date |
| --- | --- | --- | --- | --- |
| Japan | June 13, 1988 | 63-143593 | 1-312517 | Dec. 18, 1989 |
| Japan | Feb. 9, 1990 | 2-27163 | 3-231707 | Oct. 10, 1991 |
| Japan | Mar. 12, 1990 | 2-58185 | 3-260607 | Nov. 20, 1991 |
| Japan | Aug. 30, 1990 | 2-226450 | 4-109206 | Apr. 10, 1992 |
| Japan | July 5, 1991 | 3-165526 | | |
| Japan | July 5, 1991 | 3-165527 | | |
| Japan | July 5, 1991 | 3-165528 | | |
| Japan | Nov. 22, 1991 | 3-307414 | | |
| Japan | May 19, 1992 | 4-126430 | | |

PRIOR ART

An optical communication cable which has recently found extensive applications exhibits a number of advantages over a conventional electric wire communication cable, including immunity from the influences of electromagnetic noises, high transmission capacity per single core, and freedom from signal interference which might otherwise occur from a contact with a hot line such as a high tension power cable or jumper cable connected between instruments.

Commercially available optical fiber cables, which exhibit such advantages, can be categorized into two types. One type includes a core assembly having a strand comprising a core and a cladding, which may be formed of quartz or plastics material, and having a thin resin coat as a primary coating, and to which a secondary coating is provided by utilizing an organic polymer to provide a polymer clad optical fiber cable, and is disclosed, for example, in Japanese Laid-Open Patent Applications No. 142,308/1983 and No. 263,104/1985. In the other type, the organic polymer used for the secondary coating is replaced by a metal tube, through which the core assembly extends, thus providing a metal tube clad optical fiber cable.

An optical fiber cable is provided with a connector for connection thereof with a communication equipment. The connector is subject to a given standard (which may be, for example, JIS C 5973 "F04 type single core optical fiber connector"). FIG. 24a shows an example of a polymer clad optical fiber cable which is provided with such a connector, and FIG. 24b shows it in cross section, to an enlarged scale. It is to be noted that FIG. 24b shows a section of a connector shown in FIG. 24a as it is cut through a plane parallel to the plane of the drawing and containing the axis of an optical fiber cable 19. A core rod 9 of the cable 19 extends through a ferrule 12 and is secured thereto. A core assembly 10 including the primary coating of the core rod 9 is also secured to the ferrule 12. The ferrule 12 extends through a center opening formed in an inner flange 11e of a plug frame 11, and is prevented from moving to the right of the ferrule 12 by having its outer flange 12a disposed in abutment against the inner flange 11e. The inner flange 11e of the plug frame 11 is located substantially midway between its forward (right-hand, as viewed in this Figure) and its rear (left-hand) opening. A stop ring 7 has its forward end extending into the rear opening of the plug frame to press against a coiled compression spring 14, which urges the ferrule 12, causing the outer flange 12a on the ferrule 12 to abut against the inner flange 11e. In this manner, the ferrule 12 is normally urged to the right.

On its outer periphery, the stop ring 7 is formed with a pair of crescent projections 7a, 7b, which are formed by notching a flange-like projection formed around the periphery of a sleeve by forming grooves therein parallel to each other, and which fit into slit-like slots 11a, 11b formed in the plug frame 11, whereby the stop ring 7 is integrally coupled to the plug frame 11. A caulked ring 22 has its inner surface joined to the outer periphery of the stop ring 7 at its rear end. An enclosure 19a of the optical fiber cable 19 is clamped against and secured to the rear end, having a reduced diameter, of the caulked ring 22 by means of a retainer ring 21. The caulked ring 22, the retainer ring 21 and the stripped end of the optical fiber cable are covered by a rubber hood 20. A knob 15, which is formed of a synthetic resin, is a sliding fit over the hood 20 and the plug frame 11. The plug frame 11 carries tabs 11f, 11g which fit in openings formed in the knob 15, whereby the knob 15 is integrally coupled to the plug frame 11. Describing the materials used, the hood 22 is generally formed of a synthetic rubber, the retainer 21 of a stainless steel or brass, the caulked ring 22 of aluminium, the stop ring 7 of brass and the coiled spring 14 of steel or stainless steel.

FIG. 24c shows the appearance of the plug frame 11 and the stop ring 7 as they are disassembled. It is seen that the cresent projections 7a, 7b project externally from the outer peripheral surface of the stop ring 7, while the plug frame 11 is formed with slit-like slots 11a, 11b which receive these projections. In addition, the plug frame 11 is formed with a pair of oppositely located elongate slots or slits 11c which continue to the rear opening of the frame. When a cylindrical portion of the stop ring 7, which is located forward of the crescent projections 7a, 7b, is inserted into the rear opening of the plug frame 11, these projections act to force open the slit 11c, whereby they enter the rear opening even though they have an external diameter greater than the internal diameter of the rear opening. Immediately before the front end face of the stop ring 7 bears against the bottom of the rear opening, the crescent projections 7a, 7b move into slit-like slots 11a, 11b formed in the plug frame 11, whereupon the resilience of the plug frame 11 is effective to restore the slits 11c and the rear opening to their relatively closed positions to allow the plug frame 11 and the stop ring 7 to be integrally coupled together as shown in FIG. 24b.

FIGS. 25a to 25d illustrate a procedure to secure a connector as shown in FIG. 24b to the optical fiber cable 19. The procedure begins with passing the optical fiber cable 19 through the hood 20, retainer ring 21, caulked ring 22, stop ring 7 and the coiled spring 14 in the sequence named (FIG. 25a). The enclosure is removed from the extremity of the cable 19, exposing high tensile wires 23, core assembly 10 and core rod 9

(FIG. 25b). An adhesive is applied to the core rod 9, which is then passed through a corresponding opening formed in the ferrule 12, the material of which usually comprises stainless steel, to be integrally coupled thereto, and then the end faces of the ferrule 12 is subject to a finish grinding operation (FIG. 25c). Subsequently, the ferrule 12 is passed through the opening formed in the inner flange 11e of the plug frame 11, and then the coiled spring 14 is inserted through the rear opening of the frame 11 until its one end or right end bears against the plug frame 11 through the ferrule 12. The stop ring 7 is then inserted through the rear opening of the plug frame 11 to bear against the other or left end of the spring 14 and driven inward therein until the crescent projections 7a, 7b are engaged with the slit-like slots 11a, 11b formed in the plug frame 11.

The high tensile wires 13 are then disposed around the outer periphery of the stop ring 7 at its rear end, and the ring 22 is slid over the stop ring 7 to hold the wires 23 in place. The ring 22 is then caulked, thus connecting the ring 22, the wires 23 and the stop ring 7 integrally together. Subsequently, the right end of the enclosure 19a is placed around the rear end of the caulked ring 22 which has a reduced diameter, and the retainer ring 21 is displaced to the right so as to be positioned around the rear end, having a reduced diameter, of the ring 22, whereupon the retainer ring 21 is also caulked, thus integrally connecting the ring 21, the enclosure 19a and the caulked ring 22 together. Finally, the hood 20 is displaced to the right, thus covering the caulked ring 22.

The described procedure provides the optical fiber cable 19 having the connector attached thereto, the appearance of which is shown in FIG. 25d. If required, the knob 15 may be mounted thereon. As shown in FIG. 25d, the plug frame 11 of the connector may be placed, as a press fit, into a rear or left opening formed in the knob 15, whereupon a synthetic resin material used for the knob 15 is flexible enough to expand its internal space, thus allowing the knob 15 to be integrally coupled to the plug frame 11 as shown in FIG. 24b.

There are two alternatives in fitting the stop ring 7 into the plug frame 11. In the first alternative, the stop ring 7 is directly forced into the plug frame 11 while disposing the both members in a relative position as illustrated in FIG. 24c where the crescent projections 7a, 7b on the stop ring 7 are aligned with the slit-like slots 11a, 11b formed in the plug frame 11. During this procedure, when the plug frame 11 abuts against the tapered surfaces presented by the crescent projections 7a, 7b, the pair of U-shaped slits 11c which are disposed opposite to each other allows the resilience of the plug frame 11 to expand itself, thus allowing the straightforward movement of the cresent projections into the plug frame until they are fitted into the slit-like slots 11a, 11b.

Another or second alternative is to rotate the plug frame 11 through 90° about its axis from the position shown in FIG. 24c and to allow the cresent projections 7a, 7b on the stop ring 7 to move along the pair of slits 11c. When the crescent projections 7a, 7b have moved into a plane which contains the slit-like slots 11a, 11b, but where these projections are angularly spaced 90° from these slots, the plug frame 11 is rotated through further 90° to allow the crescent projections 7a, 7b to be fitted into the slit-like slots 11a, 11b while expanding the plug frame 11 utilizing the resilience thereof as provided by the provision of the pair of oppositely located U-shaped slits 11c.

As a further alternative, it is also known to threadably secure the stop ring 7 to the plug frame 11 (see Japanese Laid-Open Patent application No. 129,605/1986).

The optical fiber cable with connector of the prior art mentioned above suffers from drawbacks that it requires an increased number of parts including hood 20, retainer ring 21, caulked ring 22, stop ring 7, coiled spring 14 and ferrule 12 and is therefore expensive and that the connection between the optical fiber cable 19 and the connector is troublesome and time consuming because the caulked ring 22, the retainer ring 21 and the hood 20 must be added at a location rearward of the stop ring 7.

In either alternative technique to couple the stop ring 7 with the plug frame 11, the stop ring 7 and the plug frame 11 must be rotated relative to each other about the axis of the plug frame 11 in order to confirm if the crescent projections 7a, 7b on the stop ring 7 are engaged with the slit-like openings 11a, 11b in the plug frame 11 after the stop ring 7 is pressed straightforward into the plug frame 11 or in order to align the crescent projections 7a, 7b with the slit-like openings 11a, 11b. Even when the crescent projections 7a, 7b are not aligned with the slit-like openings 11a, 11b, a relatively strong force is required to rotate them inasmuch as they are pressed under the restoring force of the plug frame 11. On the other hand, when the crescent projections 7a, 7b are engaged with the slit-like openings 11a, 11b, a relatively strong force is again required to disengage the crescent projections 7a, 7b from the slit-like openings 11a, 11b. However, because a difference between this force and the force which is required to rotate the crescent projections 7a, 7b in order to align them with the slit-like openings 11a, 11b is small, an inadvertence in assembly is likely to occur that the stop ring 7 may be excessively turned relative to the plug frame 11 because of the difficulty in confirming the engagement therebetween to cause the crescent projections 7a, 7b to be disengaged from the slit-like openings 11a, 11b in which they were once engaged or that the both members may be left disengaged. In addition, when an inexperienced operator connects or disconnects the connector with or from an equipment, a torsion or pulling force may be applied to the hood 20, whereby the stop ring 7 may be disengaged from the plug frame 11 to cause the core assembly 10 to be snapped or the core assembly 10 or the core rod 9 to be fractured.

While the polymer clad optical fiber cable exhibits numerous advantages for use as an optical communication cable, it exhibits a substantially reduced resistance to tension, lateral pressure or a deformation such as bending inasmuch as the entire cable is formed of materials such as quartz, plastics, resin, organic polymer which exhibits reduced mechanical strength. For this reason, a linear element such as Kepler or plastics (such as Teflon, FRP or the like) which exhibits a relatively high strength is included therein in order to improve the strength. In particular, where the cable is installed as an aerial, a very high tensile strength is required for the cable, requiring a steel wire in place of a high strength plastics linear element. While the element which is essential for the transmission of a signal is the core rod, the use of a steel wire results in a thick and heavy cable.

By contrast, a metal tube clad optical fiber cable comprises a metal tube through which a core assembly extends. It exhibits an increased strength to tension, lateral pressure and bending, and is light in weight while maintaining a relatively reduced diameter. Since it is difficult to bend it into small radii, it is insusceptible to a cable snapping which gives rise to the breakage of the core assembly, thus facilitating its handling. Accordingly, its installation or wiring is easy to implement.

A metal tube clad optical fiber cable is commercially available in two types, namely, a seamless tube clad optical fiber cable and a flexible tube clad optical fiber cable. These cables may be connected to other cables or communication equipments in the following manners:

(1) A fixing nut of a connector is fixedly connected to an end of a seamless tube of the seamless tube clad optical fiber cable;

(2) A fixing nut of a connector is fixedly connected, through an adapter, to an end of a flexible tube of a flexible tube clad optical fiber cable; or (3) One end of a flexible tube is fixedly connected, through an adapter, to an end of a seamless tube of a seamless tube clad optical fiber cable, and a fixing nut of a connector is fixedly connected, through an adapter, to the other end of the flexible tube.

A seamless tube clad optical fiber cable is excellent in that the core assembly is completely isolated from outer environment, but exhibits flexibility which is inferior to that of a flexible tube clad optical fiber cable. On the other hand, a flexible tube clad optical fiber cable exhibits a degraded sealability. Accordingly, in the latest practice, a seamless tube clad optical fiber cable is employed over a major portion of the distance covered by the optical communication cable wiring, and the cable end is connected to a connector according to the manner mentioned under the paragraph (3). In other words, at a location where the cable requires to be bent into relatively small radii, a flexible tube clad optical fiber cable is connected through an adapter to the seamless tube clad optical fiber cable.

A metal tube clad optical fiber cable has a serious drawback in respect of the electrical insulation. Specifically, while the core assembly of the optical fiber which is internally contained is formed of an insulating material and hence suffers from no signal interference as a result of its contact with a hot line, the metal tube which is disposed outside represents a good electrical conductor, and therefore may cause a current flow to an equipment or devices through a connector which is attached to the end of the metal tube. Such current flow may cause a damage to the equipment or devices. Accordingly, it is desirable to cover the metal tube by using an insulating material such as an organic polymer, but a thick covering reduces the flexibility of the cable or increase the weight of the cable. On the other hand, a thin covering may be broken when subjected to relatively frequent bending/elongation or abutment against other articles.

SUMMARY OF THE INVENTION

It is a first object of the invention to provide a metal tube clad optical fiber cable having an increased mechanical strength and in which an internally disposed core assembly is insusceptible to damage; a second object is to prevent a current flow from occurring from a metal tube clad optical fiber cable to a connected equipment through an attached connector; a third object is to reduce the number of parts required for a metal tube clad optical fiber cable with connector and to facilitate the connection between the cable and the connector; and a fourth object is to provide a reliable coupling of the connector with the cable and to prevent the disengagement therebetween after they are once coupled.

A metal tube clad optical fiber cable according to a first embodiment of the invention comprises a metal adapter (2) coupled to an equipment; an optical fiber cable (3, 6, 10) having a metal tube covering (6); an insulator ferrule (12) for carrying an end of the optical fiber (10) which is located outside the end of the metal tube covering (6) and for guiding the fiber end into an optical fiber receiving opening in the metal adapter (2); a spring member (14) for urging the insulator ferrule (12) in a direction to extend through the metal adaptor (2); an insulator base (11, 15) having its one end secured to the metal adapter (2) for supporting the insulator ferrule (12) to be movable in said direction; and a cable connector (7, 8) of a metal material having its one end secured to the other end of the insulator base (11, 15) and its other end secured to at least the metal tube covering of an optical fiber cable (3, 6, 10). Numerals appearing in parentheses refer to corresponding elements or parts of a first embodiment to be described later and shown in FIG. 1.

With this arrangement, the base (11, 15) is an insulator, which assures high level of insulation between the metal tube and its connected equipment or device. By way of example, if it moves into contact with a hot wire, no current flows into such equipment or device to destroy it. Since the optical fiber (10) is clad by the metal tube, it exhibits a high strength while maintaining a reduced weight. In this manner, a high reliability optical fiber can be obtained.

In several modifications (shown in FIGS. 2, 7 and 8) of the first embodiment, a fixing nut (8) fixedly connected to the base (11, 15) is formed of an insulating material. In a further modification (FIG. 3), a cable adapter (7) having its one end fixedly connected with a fixing nut (8) and its other end secured to at least a metal tube covering of an optical fiber cable (3, 6, 10) is formed of an insulating material. In a still another modification (FIG. 4), an adapter (16) which connects the metal tube (6) to the base (11, 15) is formed of an insulating material.

A metal tube clad optical fiber cable according to a second embodiment of the invention comprises an optical fiber cable (19B) having a metal tube covering (6); a plug fram (11) including a forward opening, a rear opening, an internal space communicating with the both openings and an inner flange (11e) extending into the inner space; a ferrule (12) including an outer flange (12a) disposed for abutment against the inner flange (11e) and a central opening through which a core rod (9) of the optical fiber cable (19B) extends and extending through a central opening defined by the inner flange (11e) from the rear opening toward the forward opening; a coiled compression spring (14) having its one end abutting against the ferrule (12) for urging the ferrule (12) in a direction from the rear opening toward the forward opening; and a stop ring (7) including a forward end coupled to the rear end of the plug frame (11) and providing an abutment for the other end of the coiled compression spring (14), a rear end having an opening of a relatively large diameter to permit the optical fiber cable (19B) to extend therethrough, and a central opening extending from said opening to the forward end and through which a core assembly (10) of the optical fiber cable (19B) extends. Numerals appearing in parentheses designate corresponding elements or parts of a second embodiment to be described later and shown in FIGS. 9a to 9c.

With this arrangement, the cladding (3, 6) of the optical fiber cable (19B) is secured to the rear end of the stop ring (7) while the forward end of the stop ring (7) is coupled to the plug frame which supports the ferrule (12), thus dispensing with the caulked ring (22), the retainer ring (21) and the rubber hood (20) shown in FIG. 24b of the prior art, and thus the structure uses a reduced number of parts. This reduces the cost of the connector and facilitates its assembly.

In the second embodiment (FIGS. 9a to 9c), the stop ring 7 includes engaging projections (7a, 7b) and locking projections (7c, 7d) which project outward of the outer peripheral surface of the forward end; and the plug frame (11) includes engaging slots (11a, 11b) in which the engaging projections (7a, 7b) are fitted, and elongate slots (11c) which are open to the rear opening for receiving and guiding the movement of the locking projections (7c, 7d) in a direction from the rear opening toward the forward opening while blocking a rotation of the locking projections (7c, 7d) about the axis of the stop ring (7). As a result, in one step of pressing the forward end of the stop ring (7) into the rear opening of the plug frame (11) while aligning the locking projections (7c, 7d) with the elongate slots (11c), the engaging projections (7a, 7b) of the stop ring (7) fit in the engaging slots (11a, 11b) in the plug frame (11) to complete the coupling of the stop ring (7) with the plug frame (11). Subsequently, the elongate slots (11c) prevent the projections (7c, 7d) from rotating, whereby the stop ring (7) is no longer rotatable relative to the plug frame (11). The detent provided by the engaging projections (7a, 7b) and the engaging slots (11a, 11b) is sufficiently strong that the stop ring (7) cannot be disengaged from the plug frame (11) if the ring (7) is pulled in the opposite direction from the direction in which it is inserted into the plug frame (11).

In a modification (FIGS. 11a and 11b) of the second embodiment, the stop ring (7) includes engaging projections (7a, 7b) which projects outward from the outer peripheral surface of the forward and guide grooves (7g, 7h) extending from its forward end face in a direction in which the central opening extends; and the plug frame (11) includes engaging slots (11a, 11b) in which the engaging projections (7a, 7b) are fitted, and locking projections (11j, 11k) fitted in the guide grooves (7g, 7h), whereby their movement is guided by the direction in which the guide grooves (7g, 7h) extend while the rotation about the axis of the stop ring (7) is prevented. As a result, in one step in which the forward end of the stop ring (7) is pressed into the rear opening of the plug frame (11) while aligning the guide grooves (7g, 7h) with the locking projections (11j, 11k), the engaging projections (7a, 7b) of the stop ring (7) are fitted in the engaging slots (11a, 11b) in the plug frame (11) to complete the coupling between the stop ring (7) and the plug frame (11). Subsequently, the locking projections (11j, 11k) prevent the guide grooves (7g, 7h) from rotating, and accordingly, the stop ring (7) cannot rotate relative to the plug frame (11). The detent provided by the engaging projections (7a, 7b) and the engaging slots (11a, 11b) is sufficiently strong that the stop ring (7) cannot be disengaged from the plug frame (11) if the ring is pulled in the opposite direction from the direction in which it is inserted into the plug frame (11).

Other objects and features of the invention will be apparent from the following description of several embodiments thereof with reference to the drawings.

BRIEF DESCRIPTION OF THE DRAWINGS

FIG. 9b is an exploded perspective view of the second embodiment shown in FIG. 9a, illustrating the appearance of several parts;

FIG. 11b is a cross section taken along the line B—B shown in FIG. 11a;

FIG. 17a is a side elevation of a loop of a reduced diameter which is drawn under tension from the flexible tube 6 shown in FIG. 16a;

FIG. 22a is a side elevation of a loop formed by the flexible tube 6 shown in FIG. 21a;

FIG. 24b is an enlarged of a connector used with the optical fiber cable shown in FIG. 24a through a plane parallel to the plane of FIG. 24a;

DESCRIPTION OF PREFERRED EMBODIMENTS

First Embodiment

Figure 1:
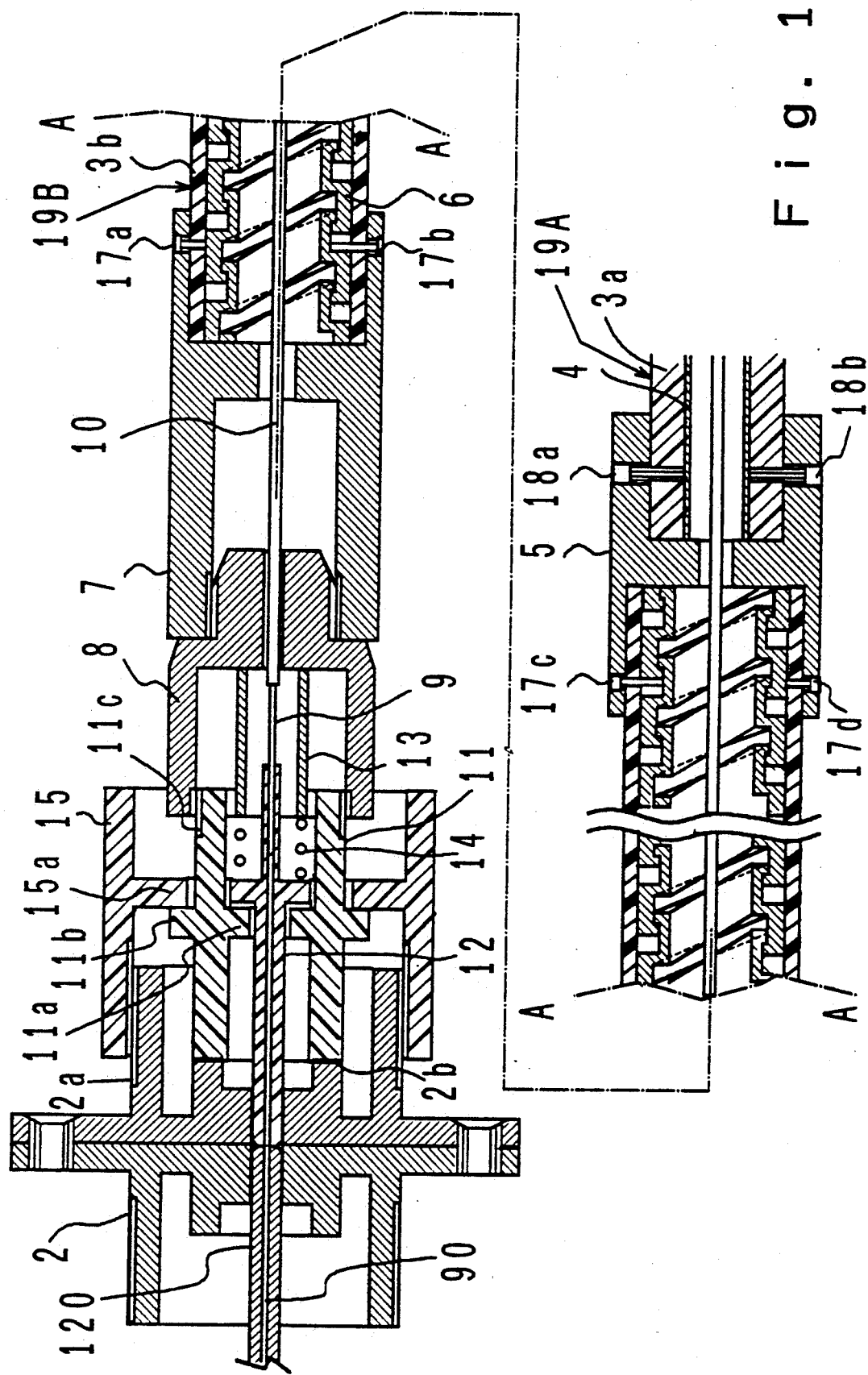
FIG. 1 is a longitudinal section of a first embodiment of the invention.

FIG. 1 shows one end of a metal tube clad optical fiber cable according to a first embodiment. It is to be understood that the other end of the cable is constructed in the similar manner. A cable body comprises a seamless tube clad cable 19A including a seamless tube 4 which is coated by PV resin 3a. One end of a relay adaptor 5 is fixedly connected with the seamless tube 4 by means of set screws 18a, 18b. The other end of the relay adaptor 5 is fixedly connected with one end of a flexible tube 6 of a flexible tube clad cable 19B by means of set screws 17c, 17d, the flexible tube 6 being coated by PV resin 3b. The other end of the flexible tube 6 is fixedly connected with one end of an adaptor 7 by set screws 17a, 17b. The other end of the adaptor 7 is threadably engaged with a fixing nut 8. An optical fiber assembly 10 including a core rod 9 formed by a core and a cladding thereon and a primary coating formed by a thin resin coat extends through the seamless tube 4, adaptor 5, flexible tube 6, adaptor 7 and fixing nut 8. It is to be noted that the flexible tube 6 tends to maintain its straightness lengthwise.

A connector includes a cylindrical body 11. A ferrule 12 is inserted into the front portion of the body 11 while a collar 13 is inserted into the rear portion of the body 11. The forward end of the ferrule 12 projects from the body 11. A coiled compression spring 14 is disposed between the ferrule 12 and the collar 13. The ferrule 12 is splined to the body 11, and includes a flange which bears against an inner flange 11a on the body 11. The body 11 extends through a connecting nut 15.

The connecting nut 15 shown in FIG. 1 is threadably engaged with the connector adaptor 2 which is formed of a metal and which is secured to a communication equipment, not shown. As a result of the threadable engagement, as the nut 15 is clamped, an inner flange 15a on the connecting nut 15 bears against an outer flange on the body 11, whereby the body 11 is clamped to the connector adaptor 2. At its rear end, the body 11 is formed with male threads 11c around its outer periphery, which are engaged by female threads of the fixing nut 8. The resilience of the coiled compression spring 14 urges the ferrule 12 against a ferrule 122 located on the part of a communication equipment in axial position of the connector adaptor 2, whereby the front end face of the ferrule 12 is held in close contact with the front end face of the ferrule 120 of the communication equipment. The axis of the core rod 9 which is secured to the ferrule 12 must be aligned with the axis of a core rod 90 secured to the ferrule 120 with accuracy on the order of 1 to 2 μ.

Located between the metal tube of the cable, or flexible tube 6, and the connector adaptor 2 of the communication equipment are the adaptor 7, the fixing nut 8 and the body 11. In the first embodiment, the body 11, the ferrule 12 and the connecting nut 15 are formed of an insulating material, which is chosen to be polycarbonate which exhibits abrasion strength and high strength. Thus the insulator body 11 provides an electrical disconnection in the mechanical coupling from the flexible tube 6 to the connector adaptor 2. Accordingly, if an abnormal current flow occurs through the flexible tube 6, it is not transmitted to the connector adaptor 2. The described insulator exhibits a volume resistivity (at relative humidity of 50% and at temperature of 23° C.) $> 10^{13}$ $\phi$ cm and a dielectric strength (according to a short time technique for a thickness of 3.17 mm) $> 100$ kV/cm. While polycarbonate which exhibits abrasion resistance and high strength is used for the body 11, the ferrule 12 and the connecting nut 15 in FIG. 1, any other resin, ceramic or a mixture thereof may be used for these members. It will be appreciated that a certain degree of mechanical strength is required of these parts, and it is desirable that the tensile strength be equal to or greater than 150 kgf/cm$^2$.

In the first embodiment, the seamless tube clad cable 19A and the flexible tube clad cable 19B have been used in combination, but it should be understood that the invention is equally applicable where the adaptor 7 is directly secured to the seamless tube clad cable 19A or to the flexible tube clad cable 19B alone.

Figure 2:
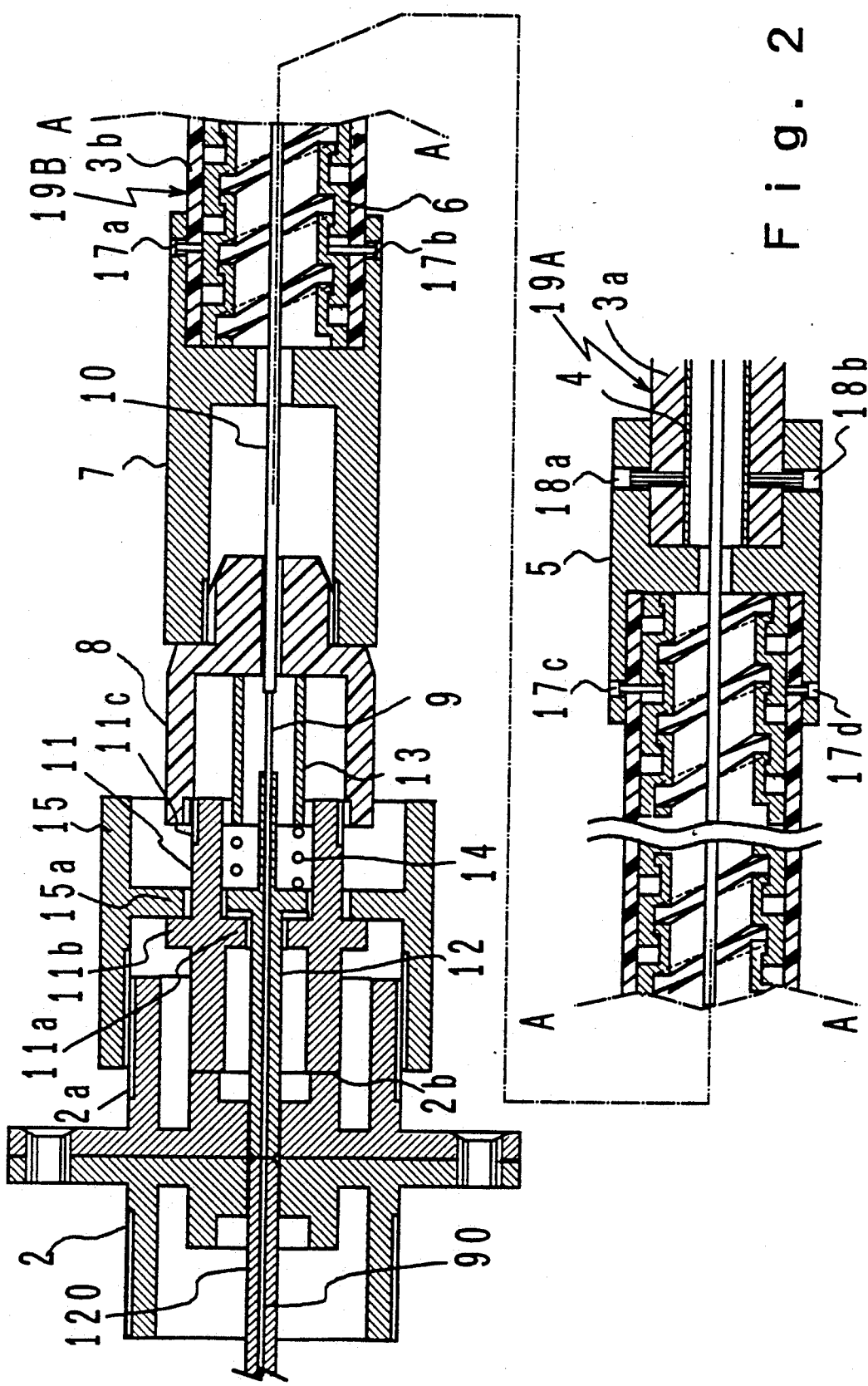
FIG. 2 is a longitudinal section of a first modification of the first embodiment.

Also, although the ferrule 12, the connecting nut 15 and the body 11 are formed of an insulating material in the embodiment shown in FIG. 1, instead of utilizing such choice, the fixing nut 8 may be formed of an insulating material as illustrated in FIG. 2. In the first modification shown in FIG. 2, the fixing nut 8 comprises glass fiber filled, phenolic-formalin resin.

Figure 3:
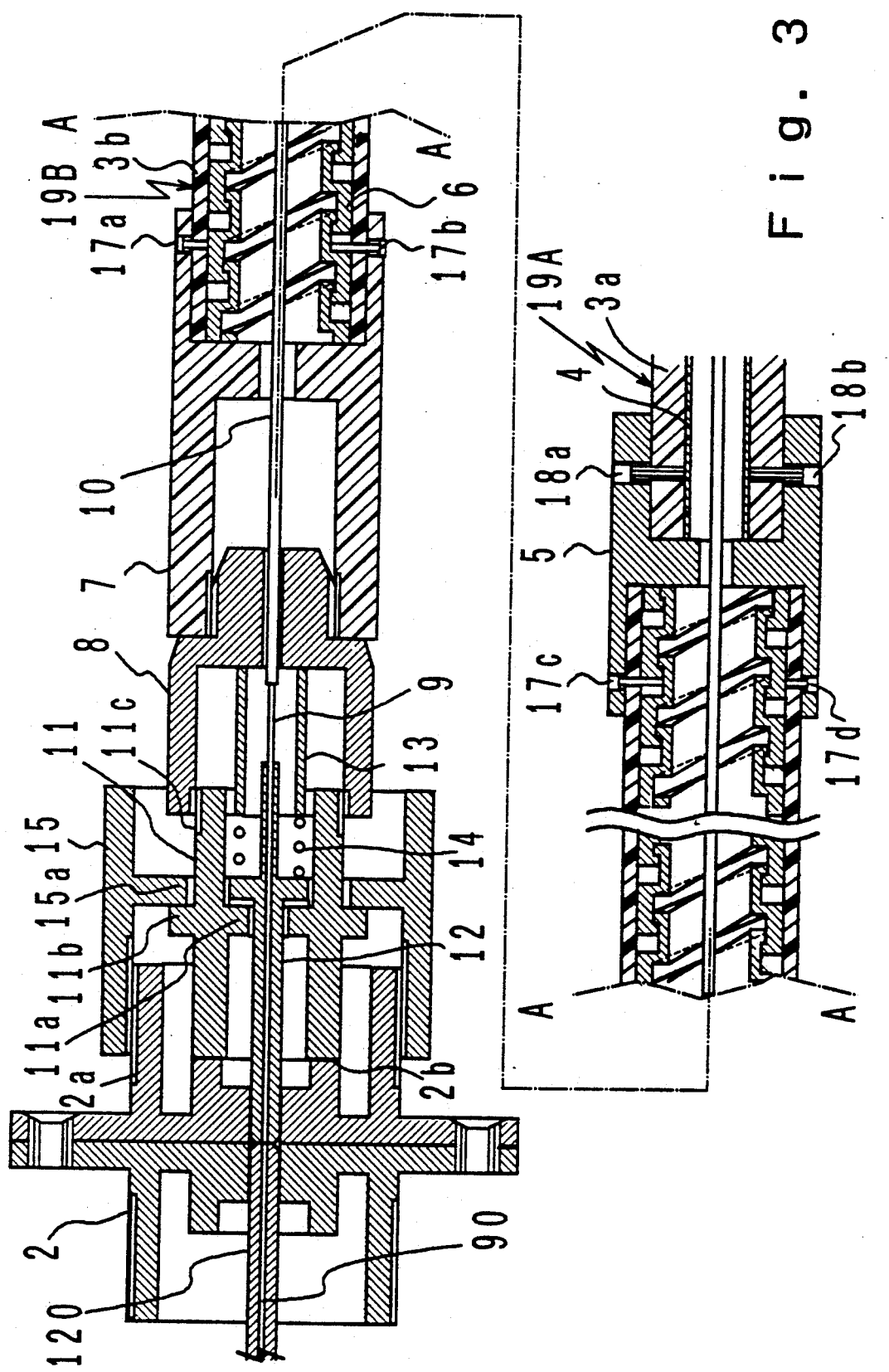
FIG. 3 is a longitudinal section of a second modification of the first embodiment.

In a second embodiment shown in FIG. 3, the adaptor 7 is formed of polyethylene as an insulating material.

While not shown, a metal tube located in the vicinity of an insulator or any part which is in electrical connection with such metal tube is preferably provided with a ground connection.

Figure 4:
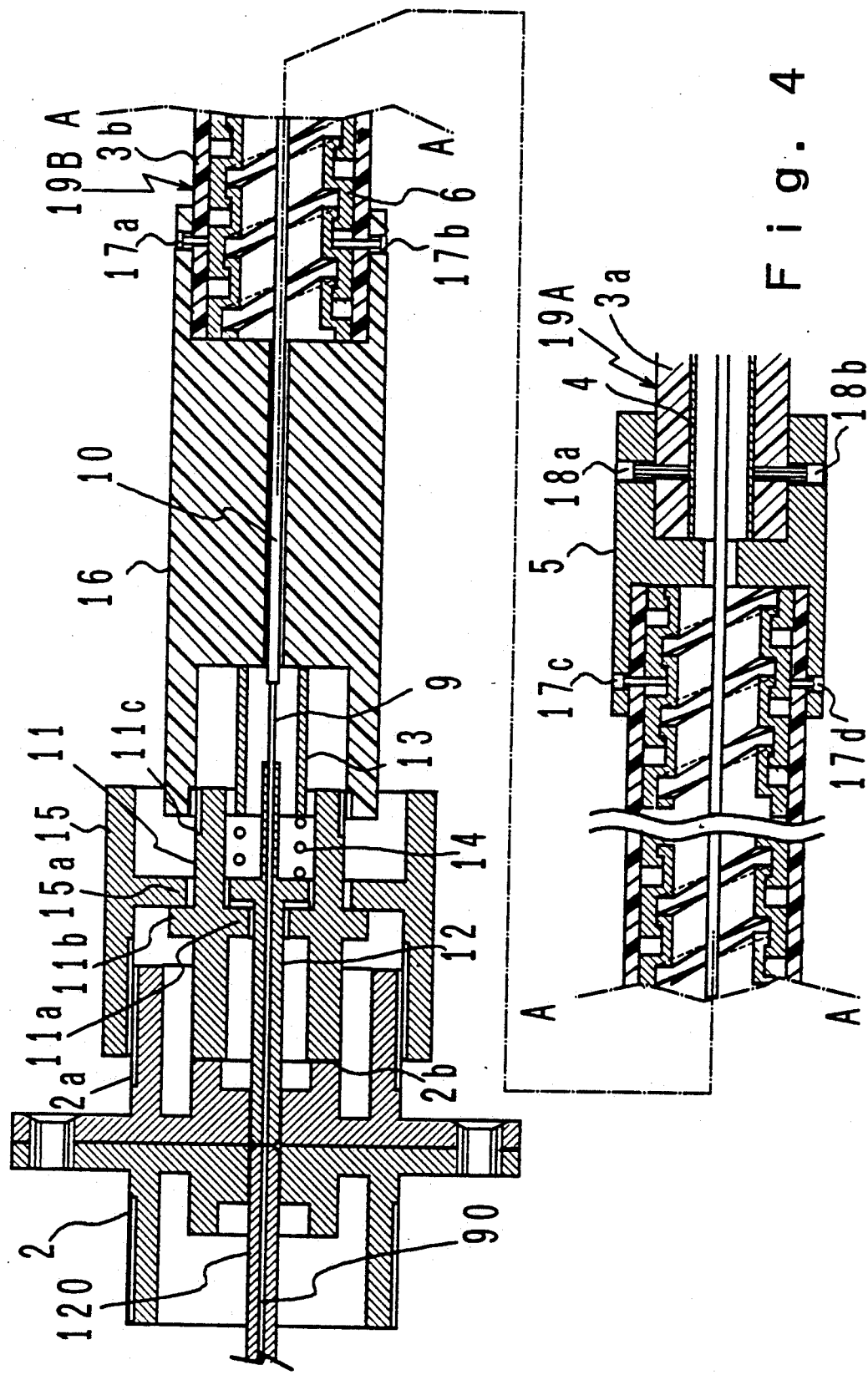
FIG. 4 is a longitudinal section of a third modification of the first embodiment.

FIG. 4 shows a third modification of the first embodiment. In this modification, an insulator adaptor 16 is used to connect the flexible tube clad cable 19B to the body 11. Thus, the adaptor 7 and the fixing nut 8 used in the arrangement of FIG. 1 are replaced by the adaptor 16 which is an integral molding to provide the both function. The connector adaptor 2, the ferrule 12 and the connecting nut 15 are formed of a metal in order to provide a resistance to the repeated connection and disconnection of the connector. In this example, the adaptor 16 is formed of polyethylene, preventing and abnormal current from passing from the flexible tube 6 to the connector adaptor 2. It will be noted that the number of parts used for the connector is reduced in the third modification.

Figure 5:
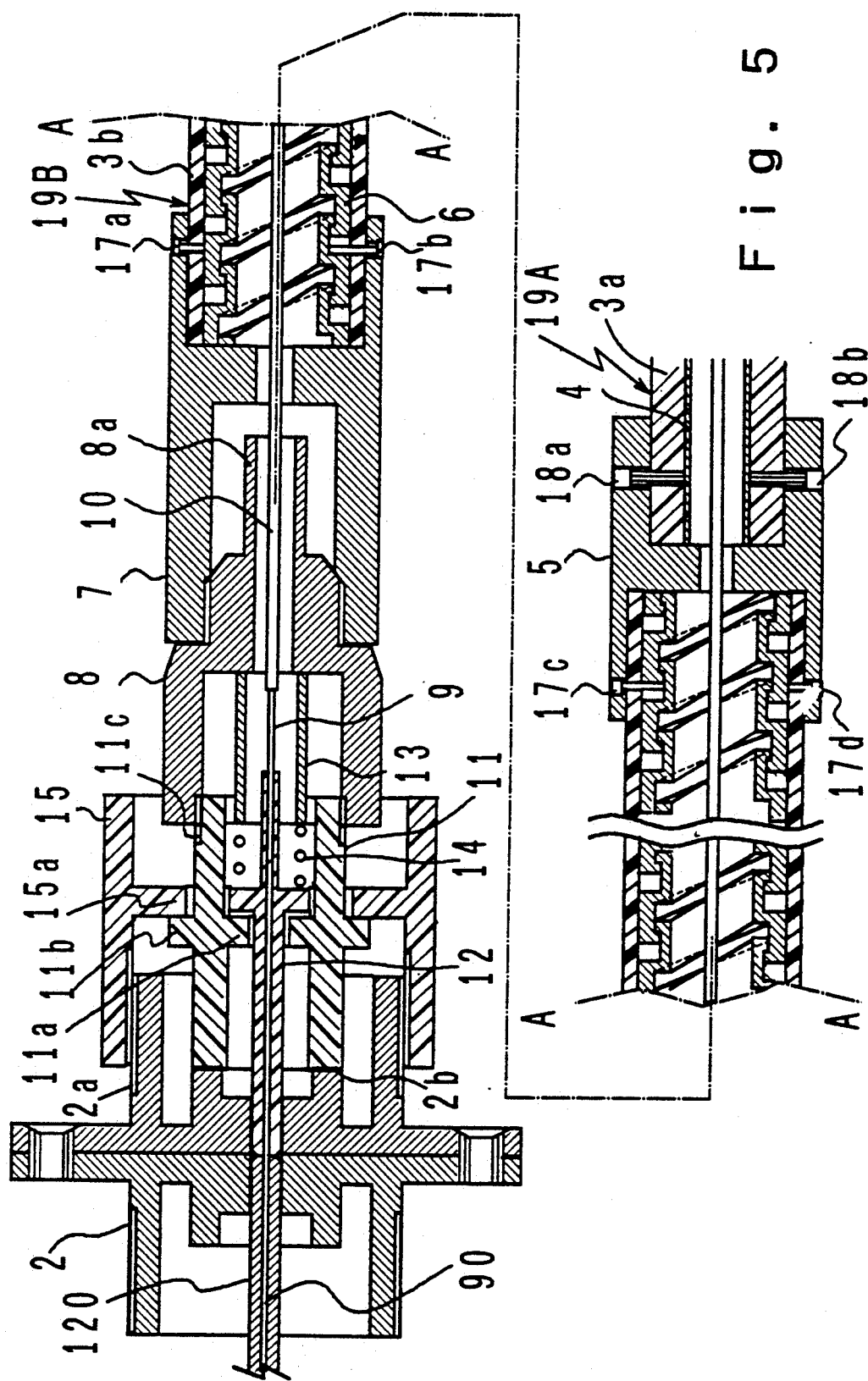
FIG. 5 is a longitudinal section of a fourth modification of the first embodiment.

FIG. 5 shows a fourth modification of the first embodiment. In this instance, the fixing nut 8 shown in FIG. 1 is changed to one carrying a rear sleeve 8a which allows the seamless tube to be secured by a caulking operation. FIG. 5 illustrates one manner of use, coupling the connector to the flexible tube clad cable 19B and accordingly the caulking function of the sleeve 8a is not utilized.

Figure 6:
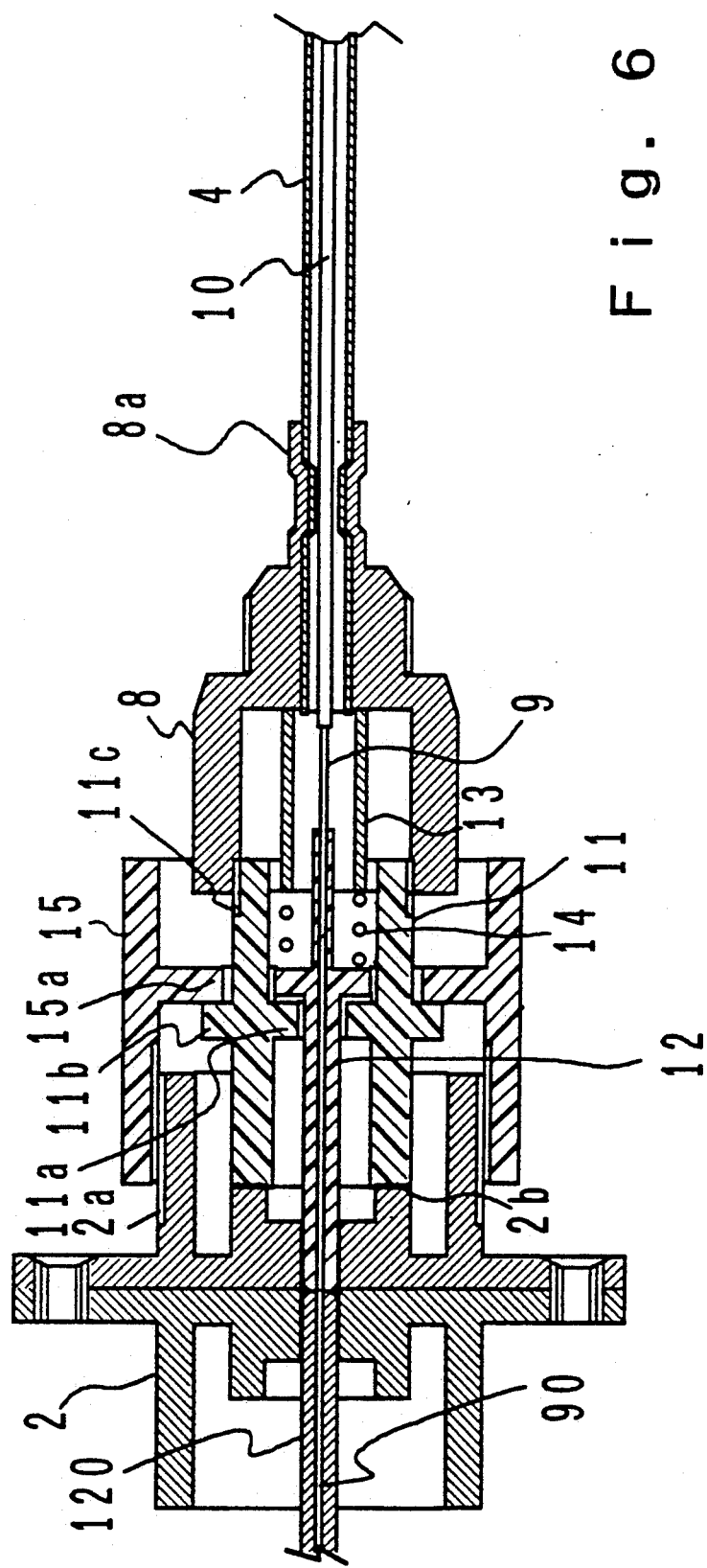
FIG. 6 is a longitudinal section of a fifth modification of the first embodiment.

FIG. 6 shows a fifth embodiment which illustrates another manner of use of the connector shown in FIG. 5. In this instance, the sleeve 8a is caulked to secure the seamless tube 4 to the fixing nut 8. In this manner, the connector shown in FIG. 5 can be used not only with the flexible tube clad cable 19B, but also with the seamless tube 4 (FIG. 6).

Figure 7:
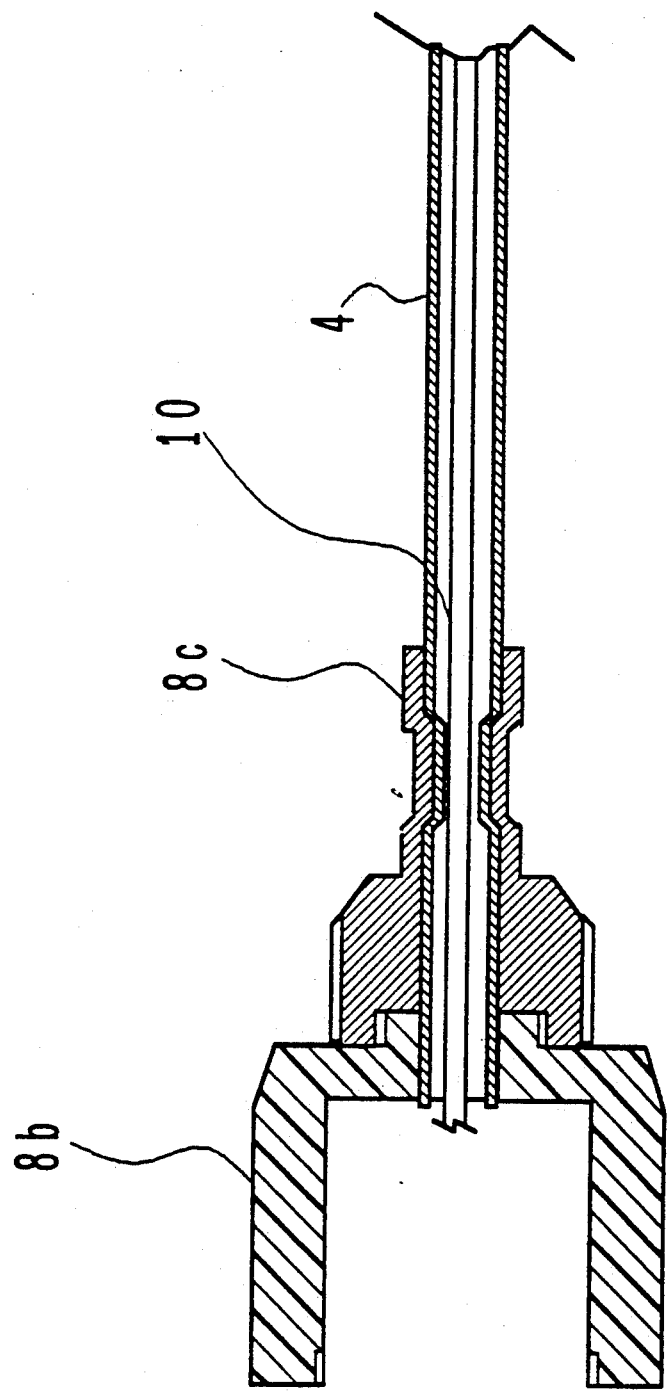
FIG. 7 is a longitudinal section of an essential part of a further modification of the fifth modification.
Figure 8:
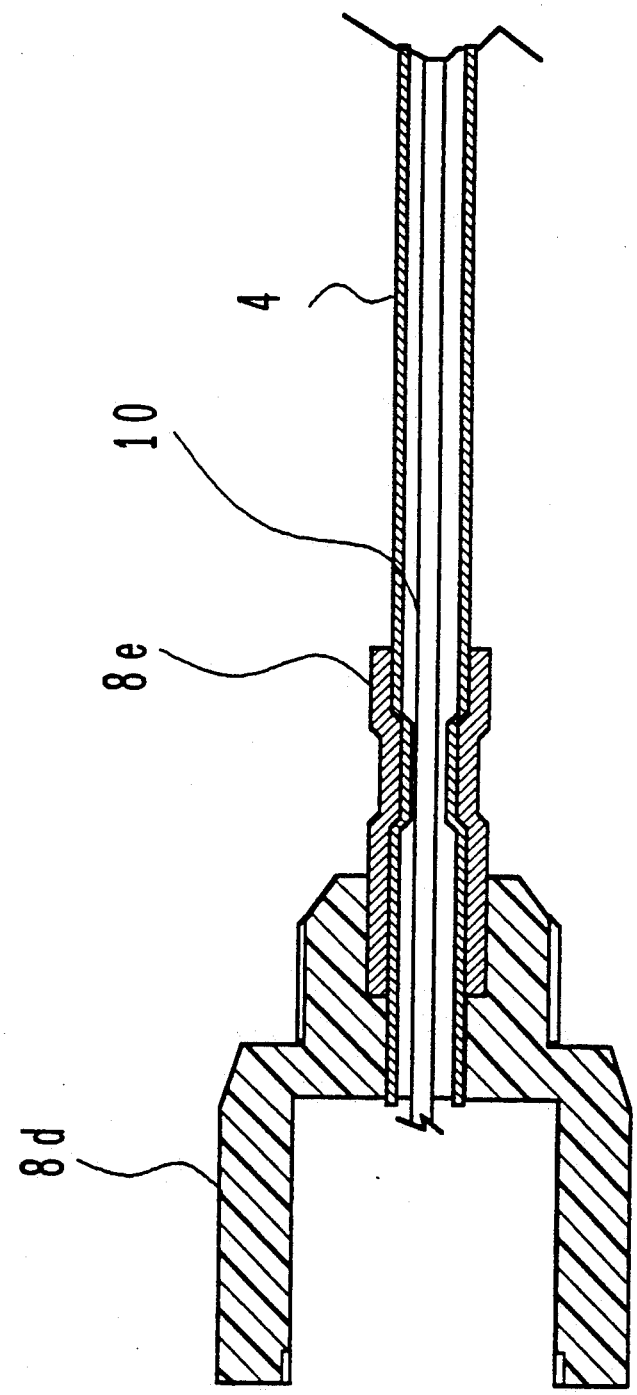
FIG. 8 is a longitudinal section of an essential part of another modification of the fifth modification.

The fixing nut 8 shown in FIGS. 5 and 6 is provided as a metal member carrying the sleeve 8a, it may comprise a nut 8b or 8d and a caulking metal member 8c or 8e as separate members, which may be integrally coupled together by a threadable engagement or by a press fit. As shown in FIGS. 7 and 8, when the nut 8b or 8d is provided as an insulator, the body 11 shown in FIG. 5, and if required, the nut 15 and the ferrule 12, to which it is coupled, may comprise metal members. In the example shown, the seamless tube 4 has a thickness of 0.2 mm, while the thickness of a reduced portion of the caulking metal member 8c or the thickness of the caulking member 8e is 0.4 mm. When the seamless tube 4 is secured by caulking the metal members 8c or 8e, the seamless tube 4 exhibits an increased resistance to tension, lateral pressure or deformation such as bending. The fixing nut 8 which includes a sleeve 8a, 8c or 8e can be used when the caulking of the metal tube is required (FIG. 6) or is not required (FIG. 5), thus increasing the applicability of the connector which is provided with such sleeve. It is undesirable in consideration of the strength that the caulking member 8c or 8e be formed of an insulating material.

Second Embodiment

Figure 9A:
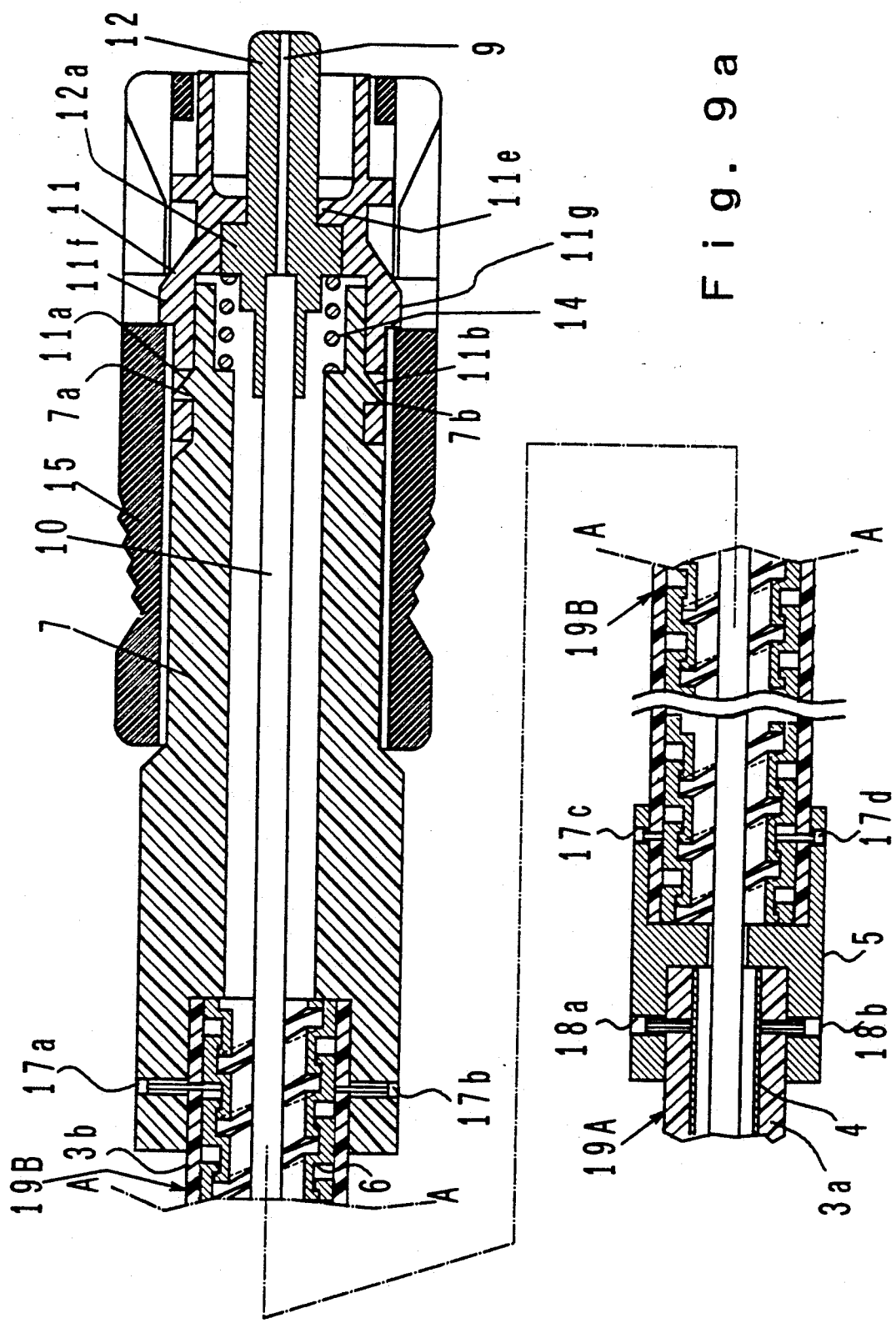
FIG. 9a is a longitudinal section of a second embodiment of the invention.

Referring to FIG. 9a which shows a second embodiment of the invention, a core rod 9 of a flexible tube clad cable 19B extends through a ferrule 12 and is secured thereto. The core rod 9 has a diameter of about 125 μm. The core rod 9 is provided with a thin resin coat, as a primary coating, to provide a core assembly 10 which is also secured to the ferrule 12. The ferrule 12 extends through a central opening formed in an inner flange 11e of a plug frame 11, and the movement of the ferrule 12 to the right is prevented by the abutment of an outer flange 12a of the ferrule 12 against the inner flange 11e. The inner flange 11e is located substantially midway between the forward or right opening and rear or left opening. One end of a stop ring 7 is fitted in the rear opening and bears one end of a coiled compression spring 14, which therefore urges the ferrule 12 to the right, thus urging the outer flange 12a of the ferrule 12 against the inner flange 11e. In this manner, the ferrule 12 is normally urged to the right.

Figure 24A:
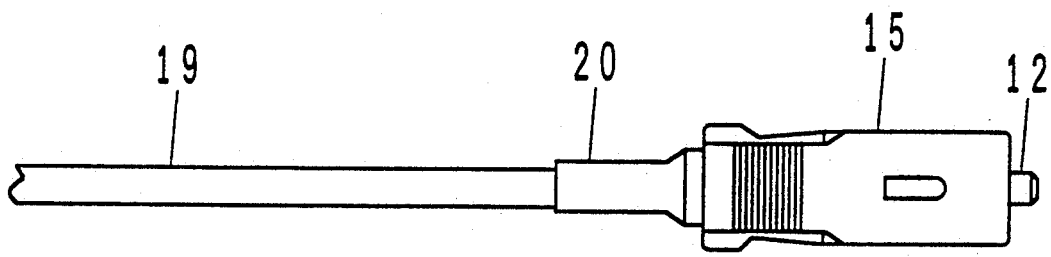
FIG. 24a is a side elevation of a conventional optical fiber cable.
Figure 24B:
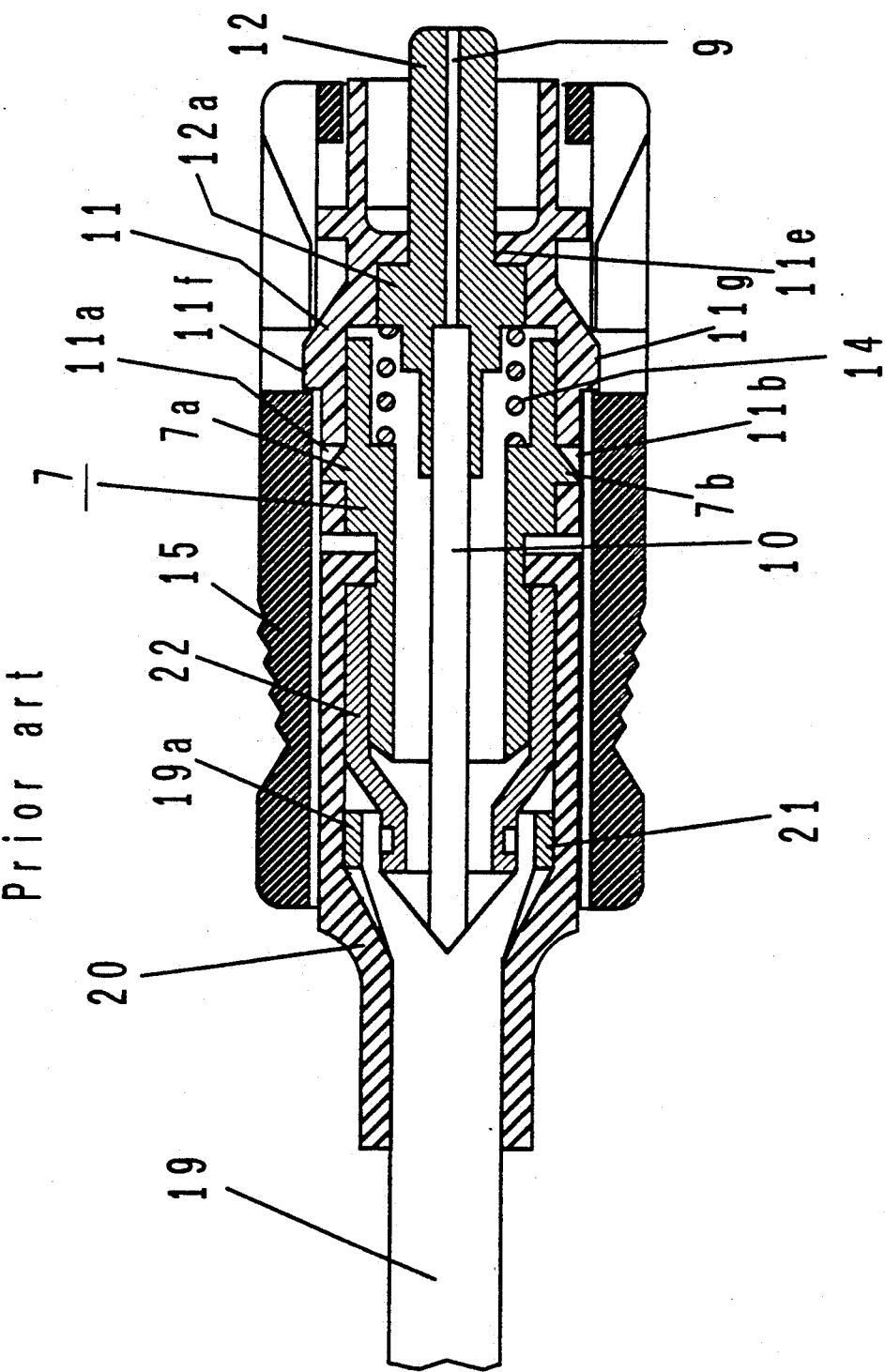
Figure 24C:
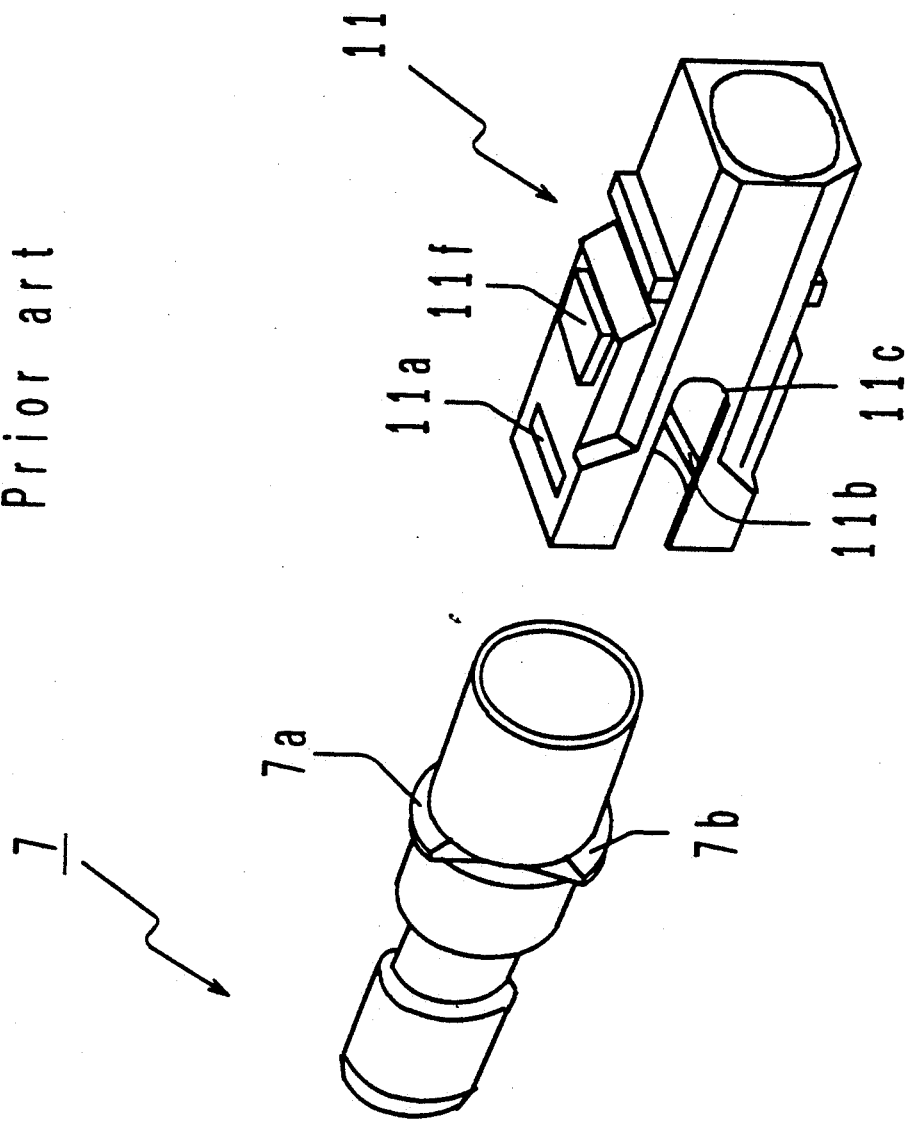
FIG. 24c is an exploded perspective view of the connector shown in FIG. 24b, illustrating the appearance of several parts thereof.
Figure 25A:
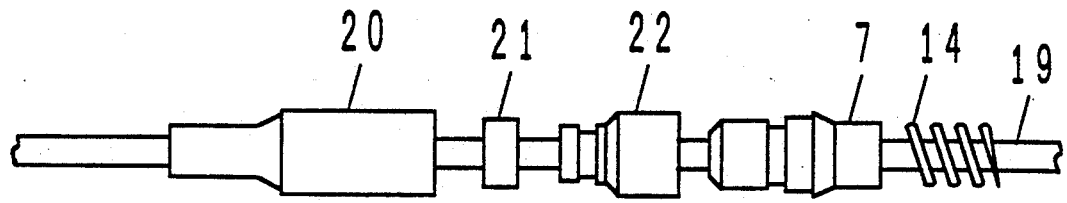
FIGS. 25a to 25d are a series of side elevations, illustrating a procedure by which a connector is assembled with the cable end before the optical fiber cable shown in FIG. 24a is constructed.
Figure 25B:
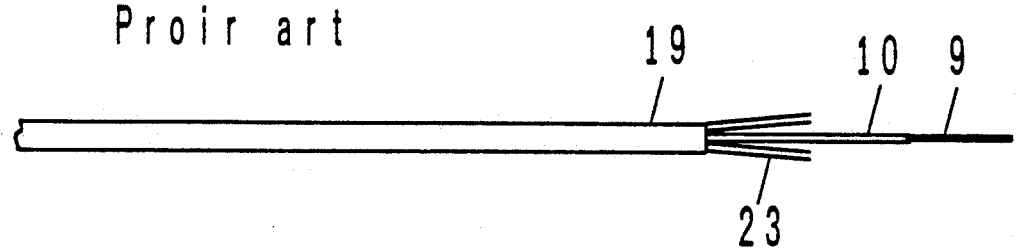
Figure 25C:
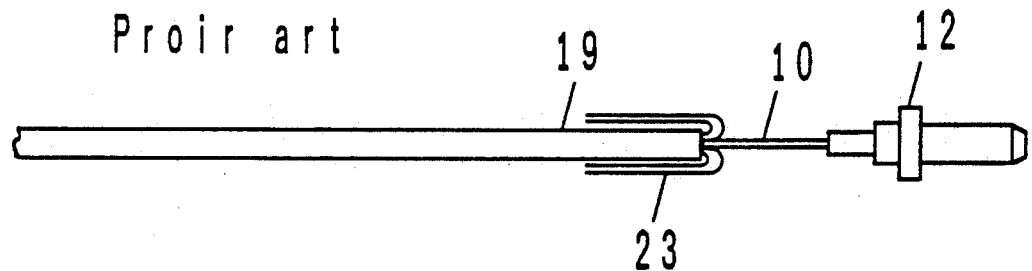
Figure 25D:
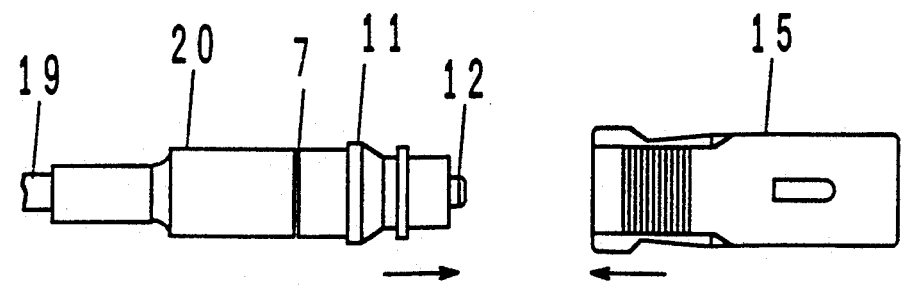

Toward its forward end, the stop ring 7 is peripherally formed with a pair of crescent projections 7a, 7b which are formed by notching a flange-like projection formed around the periphery of a sleeve by forming parallel grooves therein. These crescent projections fit in slit-like slots 11a, 11b formed in the plug frame 11, thus integrally connecting the stop ring 7 and the plug frame 11 together. The stop ring 7 is formed of a synthetic resin, and has a longer stem than that of a conventional stop ring as illustrated in FIG. 24b. The rear end of the stop ring 7 is formed with an opening of a diameter which is sufficient to allow a synthetic resin covering 3b of a flexible tube clad cable 19B to be placed therein as a press fit, and set screws 17a, 17b which are threadably engaged with threaded bores formed in the stop ring in a direction orthogonal to the axis thereof have their tip ends extending through the covering 3b to hold the flexible tube 6 in place.

In this embodiment, the flexible tube clad table 19B has a relatively short length, including a core assembly 10 passing through the flexible tube 6 which is provided with a synthetic resin covering 3b. The cable 19B is highly flexible and exhibits a high compression strength and tensile strength. A seamless tube clad cable 19A having a relatively long length and including a seamless tube 4 which is covered by a synthetic resin covering 3a is connected to the cable 19B through a relay adaptor 5. However, it is to be understood that the cables 19A and 19B form one continuous cable, and the purpose of the relay adaptor 5 is to provide a mechanical connection between the coverings 3a, 4 and 3b, 6 of the cables 19A and 19B, respectively.

Figure 9C:
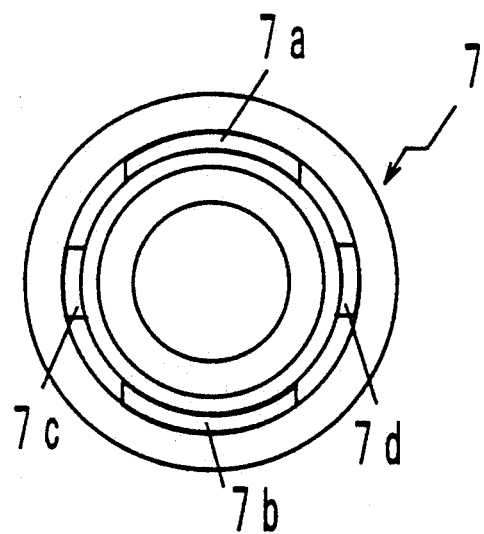
FIG. 9c is a front view of one end face of a stop ring 7 shown in FIG. 9b.

FIG. 9b illustrates the appearance of the stop ring 7 and the plug frame 11 shown in FIG. 9a as they are disassembled, while FIG. 9c shows the front end face of the stop ring 7. The stop ring 7 is peripherally provided with outwardly projecting cresent projections 7a, 7b, and a pair of axially elongate locking projections 7c, 7d are provided between the projections 7a, 7b and the forward end face. The locking projections 7c, 7d are located to be circumferentially intermediate the crescent projections 7a, 7b. The plug frame 11 is formed with a pair of slit-like slots 11a, 11b which receive the crescent projections 7a, 7b and also with a pair of elongate slots or slits 11c which receive the locking projections 7c, 7d, the slits 11c being located diametrically opposite to each other and continue to the rear opening. When the locking projections 7c, 7d are aligned with the slits 11c and the cylindrical portion of the stop ring 7 which is located forward of the crescent projections 7a, 7b is inserted into the rear opening of the plug frame 11, the greater external diameter of the crescent projections 7a, 7b than the internal diameter of the rear opening causes these projections to abut against the edge of the rear opening in the plug frame 11. When the stop ring 7 continues to be forced into the plug frame 11, the rear opening of the plug frame 11 is forced open by the crescent projections 7a, 7b to increase the size of the slits 11c, whereby the crescent projections 7a, 7b are allowed to enter the rear opening, and immediately before the forward end face of the stop ring 7 bears against the bottom of the rear opening, the crescent projections 7a, 7b move into the slit-like slots 11a, 11b in the plug frame 11, whereupon the resilience of the plug frame 11 restores the slits 11c and the rear opening to their more closed positions to complete the coupling between the plug frame 11 and the stop ring 7 in the manner illustrated in FIG. 9a. When so coupled, the stop ring 7 is prevented from rotating as a result of the notched end faces of the crescent projections 7a, 7b bearing against the inner surface of the short sides of the slots 11a, 11b and also as a result of the locking projections 7c, 7d being locked by the slots 11c. In particular, the resistance presented against the rotation which is produced by the cooperation between the locking projections 7c, 7d and the slits 11c is enhanced. The crescent projections 7a, 7b engage the slit-like openings 11a, 11b with such a strength against a force which tends to pull the stop ring 7 from the plug frame 11, whereby the stop ring 7 cannot be withdrawn unless the rear opening of the plug frame 11 is forcibly expanded.

Figure 10:
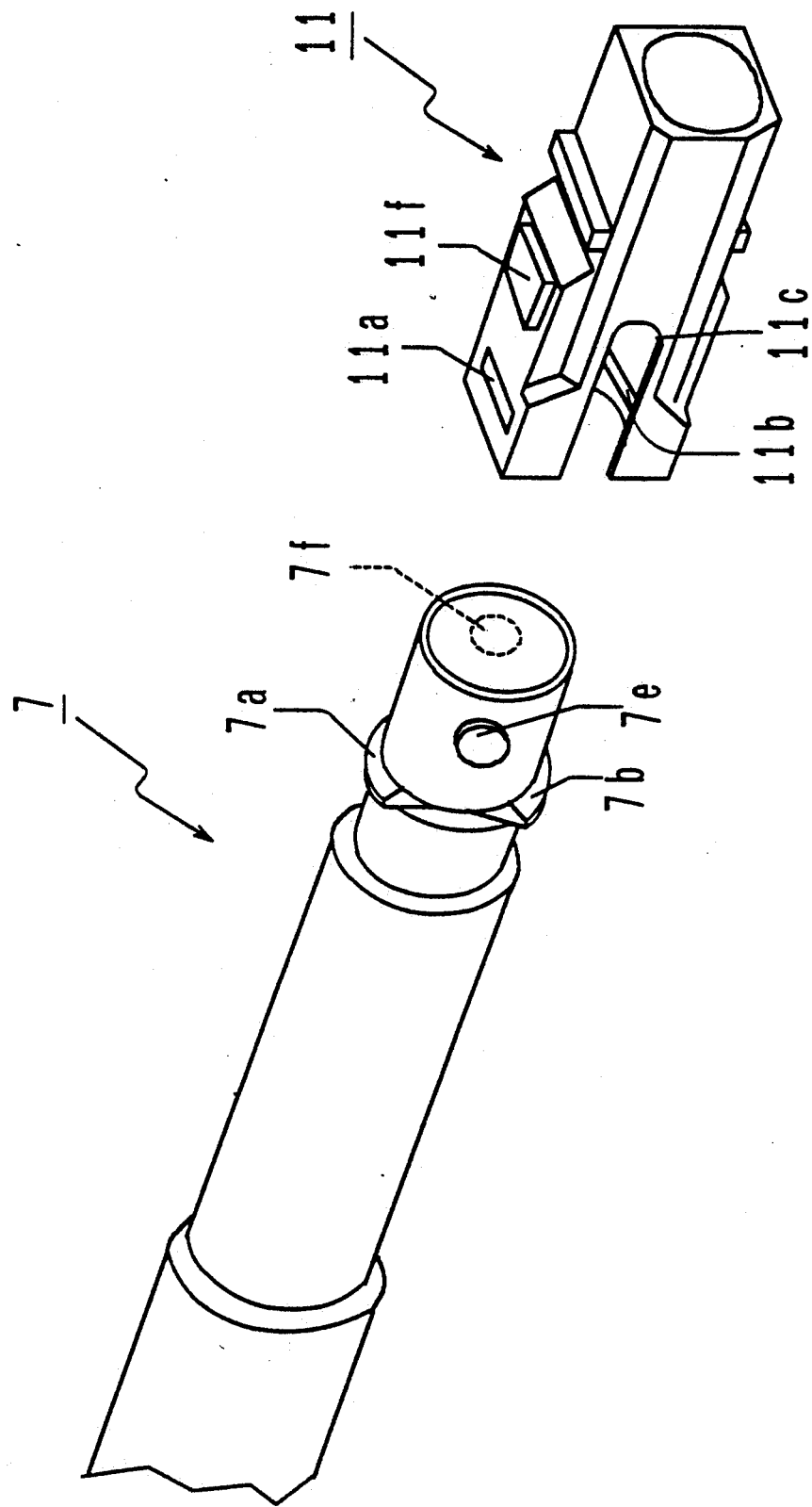
FIG. 10 is an exploded perspective view of a first modification of the second embodiment, illustrating the appearance of several parts.

FIG. 10 shows a first modification of the second embodiment. In this modification, the axially elongate locking projections 7c, 7d shown in FIG. 9b are replaced by disc-shaped projections 7e, 7f. In other respects, the construction is similar to that shown in FIG. 9b.

Figure 11A:
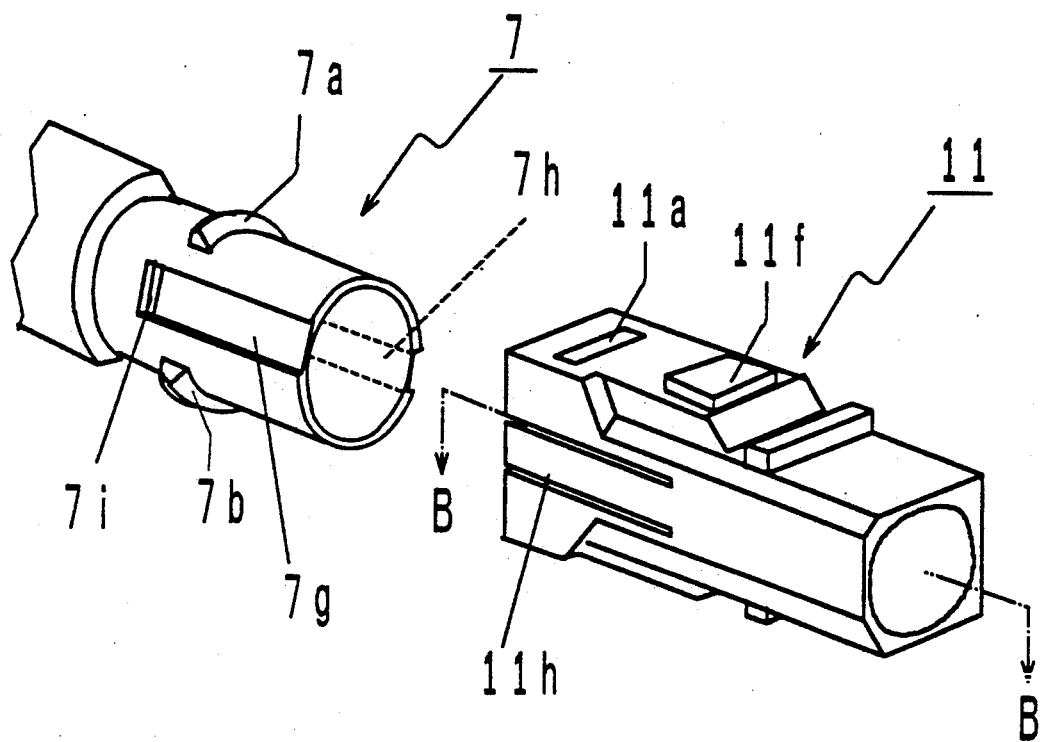
FIG. 11a is an exploded perspective view of a second modification of the second embodiment, illustrating the appearance of several parts.
Figure 11B:
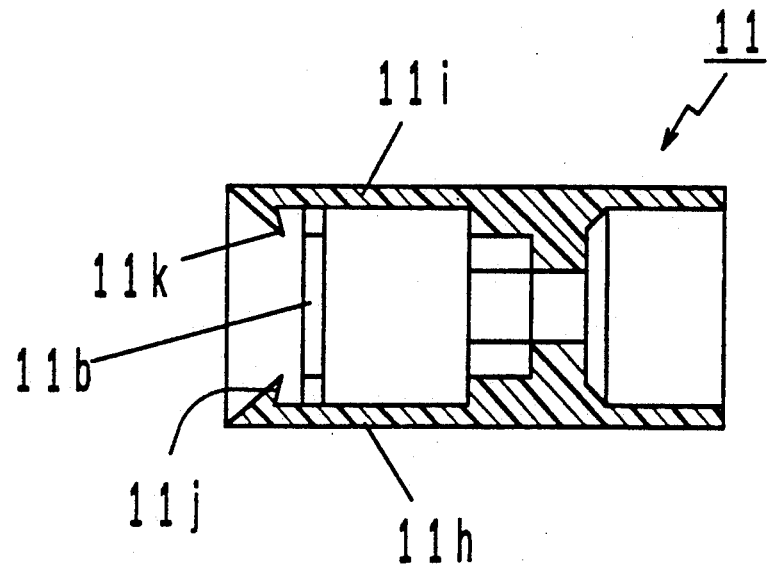

FIG. 11a shows a second modification of the second embodiment. In this modification, the outer peripheral surface of the stop ring 7 is formed with a pair of guide grooves 7g, 7h which extend from the forward opening thereof to a point located rearward of the crescent projections 7a, 7b in parallel relationship with the axis of the ring 7. Openings 7i are formed at the rear end of the guide grooves 7g, 7h to be engaged by claws 11j, 11k (FIG. 11b) to be described later. In a plane of the plug frame 11 which is orthogonal to a plane in which the slit-like openings 11a, 11b are formed, the frame 11 is formed with a pair of slits extending parallel to the axis thereof and continuing to the rear opening, these slits defining a tongue 11h. Another tongue 11i, which is similar to the tongue 11h, is formed in the surface which is located opposite to the surface in which the tongue 11h is formed. Claws 11j, 11k (FIG. 11b) are formed at the rear ends of these tongues 11h, 11i to project inwardly.

When the claws 11j, 11k on the tongues 11h, 11i of the plug frame 11 are aligned with the guide grooves 7g, 7h formed in the stop ring 7 and the stop ring 7 is inserted into the plug frame 11, the bottom surfaces of the guide grooves 7g, 7h force the claws 11j, 11k outwardly to cause the tongues 11h, 11i to be spread apart, allowing the claws 11j, 11k to be guided by the grooves 7g, 7h. Since the crescent projections 7a, 7b have an external diameter greater than the internal diameter of the rear opening, the stop ring bears against the edge of the rear opening of the plug frame 11. When the stop ring 7 is then forced into the plug frame, the rear opening of the plug frame 11 is forced open, increasing the slits 11c, allowing the crescent projections 7a, 7b to enter the rear opening of the plug frame 11. Immediately before the front end face of the stop ring 7 bears against the bottom of the rear opening of the plug frame 11, the crescent projections 7a, 7b move into the slit-like openings 11a, 11b formed in the plug frame 11, whereupon the resilience of the plug frame 11 is effective to restore the slits 11c and the rear opening to their more closed positions, thus coupling the plug frame 11 and the stop ring 7 together. At the same time, the claws 11j, 11k fit in the openings 7i formed at the rear ends of the grooves 7g, 7h, whereupon the resilience of the tongues 11h, 11i is effective to allow them to resume their original positions, assuring that the tongues 11h, 11i are a snug fit in the grooves 7g, 7h. When so coupled, a rotation of the stop ring 7 is disabled as a result of the notched end faces of the crescent projections 7a, 7b bearing against the inner surfaces of the short sides of the openings 11a, 11b and also as a result of the tongues 11h, 11i fitting in the grooves 7g, 7h and the claws 11j, 11k fitting in the openings 7i. Any force applied in a direction to withdraw the stop ring 7 from the plug frame 11 is resisted by the engagement between the crescent projections 7a, 7b and the slit-like projections 11a, 11b and the engagement between the claws 11j, 11k and the openings 7i, and accordingly, the stop ring 7 cannot be withdrawn unless the rear opening of the plug frame 11 is forcibly expanded.

Figure 12:
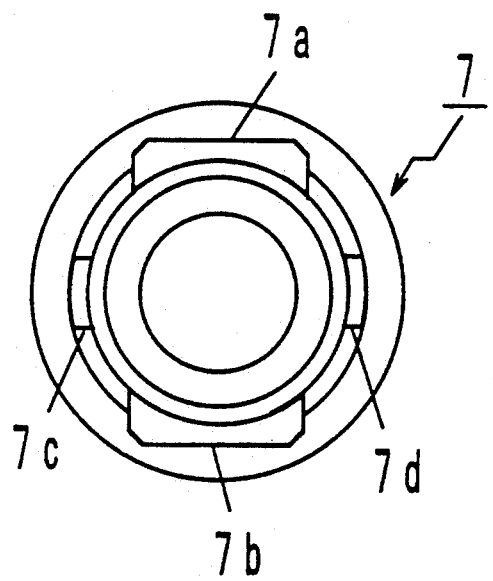
FIG. 12 is a front view of one end face of a stop ring 7 according to the second modification of the second embodiment.

In any of the second embodiment, the first and the second modification thereof, the rear half of the plug frame 11 is substantially rectangular in cross section, and accordingly the profile of the crescent projections 7a, 7b (FIGS. 9b, 10 and 11a) may be provided as presenting a rectangular profile as illustrated in FIG. 12, which is a front view corresponding to FIG. 9c and illustrating the forward end face of the stop ring 7. When such rectangular configuration is employed, the resistance to the rotation of the stop ring 7 as provided by the engagement between the projections 7a, 7b and the slit-like openings 11a, 11b can be further enhanced.

In the second embodiment and the modifications thereof mentioned above, it will be noted that the number of parts is reduced as compared with the conventional arrangement illustrated in FIG. 24b, allowing a reduction in the cost and facilitating a connection between a metal tube clad optical fiber cable and the connector. A disengagement of the stop ring from the plug frame subsequent to the completion of the connection is prevented if any force is applied therebetween tending them to rotate relative to each other or pulled apart, because of the resistance mentioned above.

Description of Flexible Tube 6

Figure 13A:
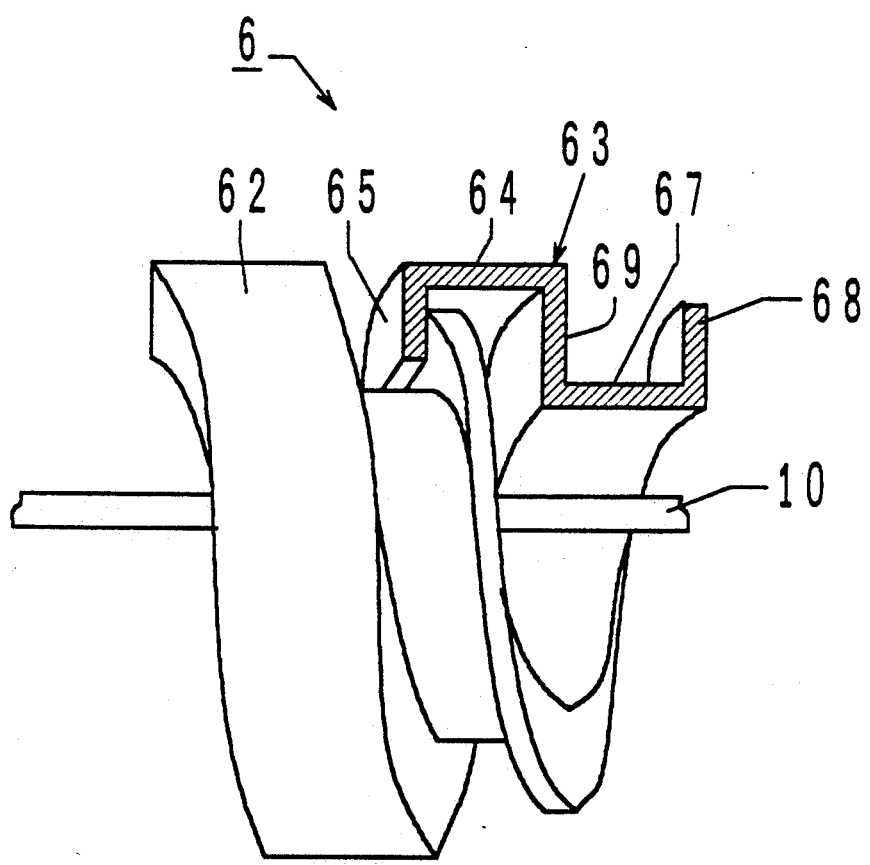
FIG. 13a is a side elevation to an enlarged scale and partly broken away, of a flexible tube 6 shown in FIG. 1.
Figure 13B:
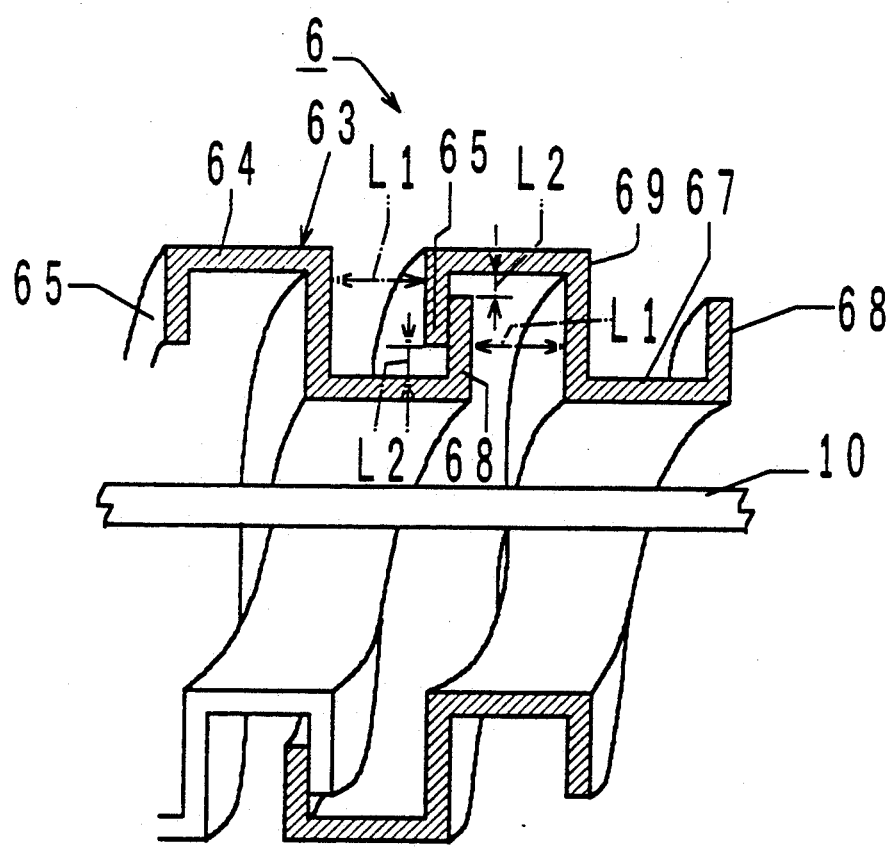
FIG. 13b is an enlarged longitudinal section of the flexible tube 6 shown in FIG. 1.
Figure 14:
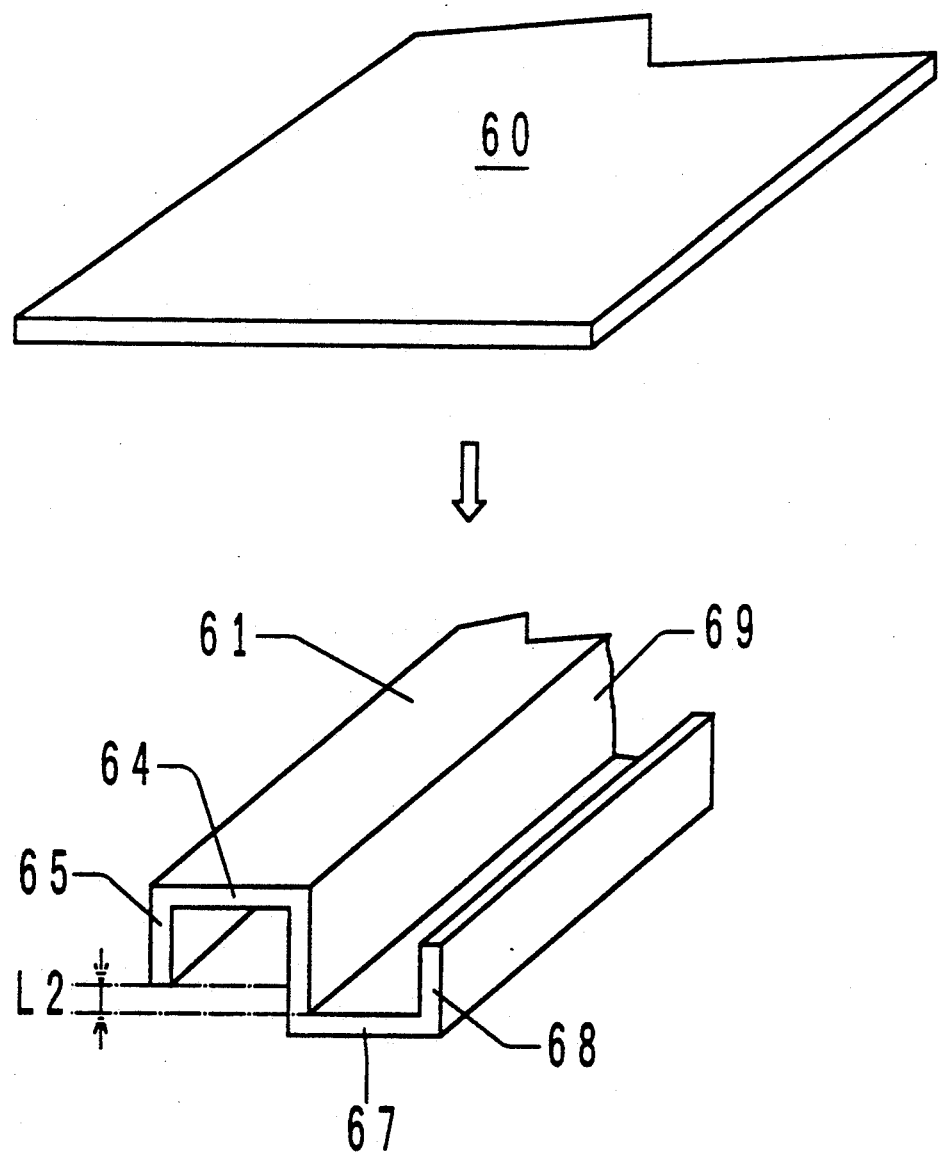
FIG. 14 is a perspective view, to an enlarged scale, of a strip plate 60 and profile member 61 which is formed from the strip plate 60 by a press operation, both used as a material to form the flexible tube 6 shown in FIG. 1.

FIG. 13a shows a block of the flexible tube 6 used in the first and the second embodiment as well as in their modifications mentioned above, corresponding to one pitch of the helical winding. One pitch block comprises a greater diameter portion 64 and a smaller diameter portion 67. The greater diameter portion 64 is provided with a first annular end 65 at its one end which projects into the smaller diameter portion 67. Similarly, the smaller diameter portion 67 is provided with a second annular end 68 at its one end which projects into the greater diameter portion 64. The greater and the smaller diameter portion 64, 67 are connected together by an annular junction 69. As shown in FIG. 13b, adjacent blocks 63 are coupled together so as to be displaceable in the axial direction. In the region where adjacent blocks are coupled together, the second annular end 68 substantially bears against the first annular end 69 of the adjacent block 63 as it is located within the greater diameter portion 64. To make the adjacent blocks 63 to be displaceable in the axial direction, the first annular end 65 and the second annular end 68 are located inside the smaller diameter portion 67 and the greater diameter portion 64 of the respective adjacent blocks to leave a clearance L1 with respect to the oppositely located annular junction 69. The internal diameter of the first annular end 65 is greater than the external diameter of the smaller diameter portion 67 to leave a clearance L2 therebetween, and the external diameter of the second annular end 68 is less tha the internal diameter of the greater diameter portion 64 so as to leave a clearance L2 therebetween. The magnitude of the clearance L2 is effective in adjusting the minimum radius with which the flexible tube 6 can be bent. The flexible tube 6 may be formed by a press operation as illustrated in FIG. 14. Specifically, a metal strip plate 60 may be pressed into a profiled member 61 which is S-shaped in section, and such members 61 may be helically wound to provide the flexible tube. To facilitate the press operation and to improve the contact between the first and the second annular end 65, 68, it is preferred that the first and the second annular end 65, 68 as well as the junction 69 be slanted in conformity to the pitch angle of the helix.

Figure 15:
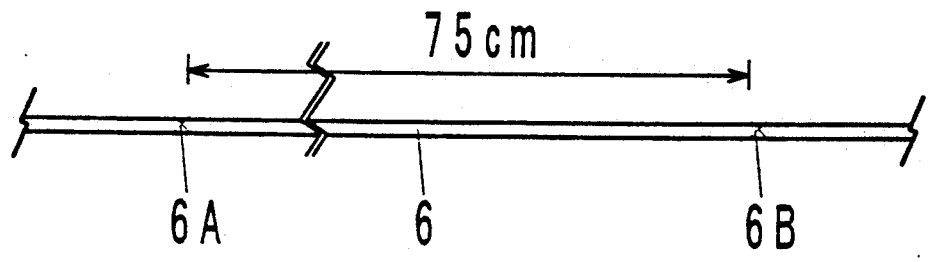
FIG. 15 is a side elevation of a tube which is to be used as a flexible tube 6 shown in FIG. 1.
Figure 16A:
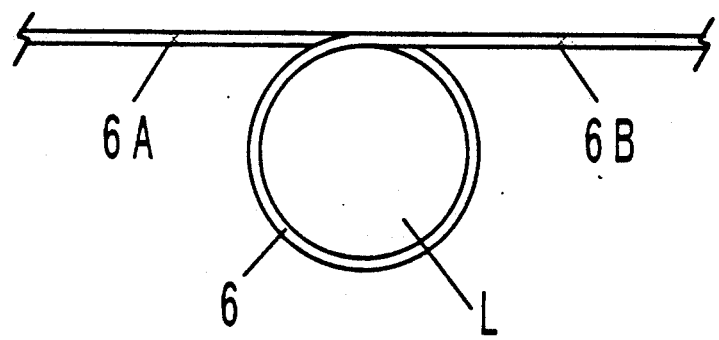
FIG. 16a is a side elevation of a loop formed by the flexible tube 6 shown in FIG. 15.
Figure 16B:
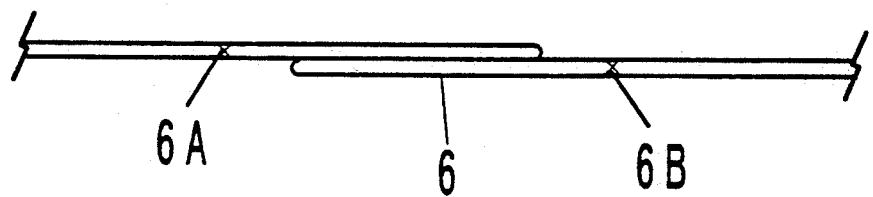
FIG. 16b is a plan view of a loop formed by the flexible tube 6 shown in FIG. 15.
Figure 17A:
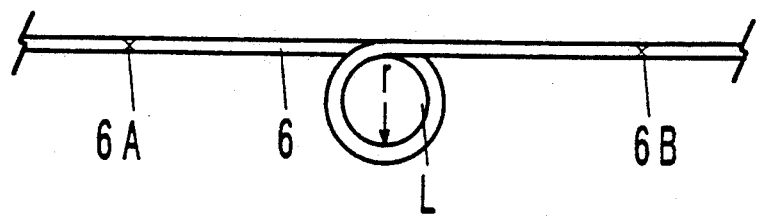
Figure 17B:
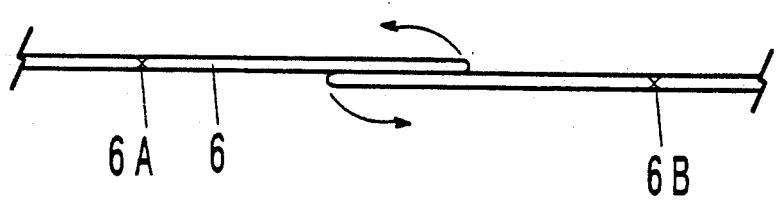
FIG. 17b is a plan view of a loop having a reduced diameter which is drawn under tension from the flexible tube 6 shown in FIG. 16b.
Figure 18A:
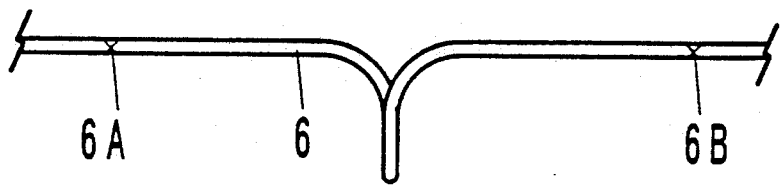
FIG. 18a is a side elevation illustrating the loop formed by the flexible tube 6 shown in FIG. 17a as it begins to open under tension.
Figure 18B:
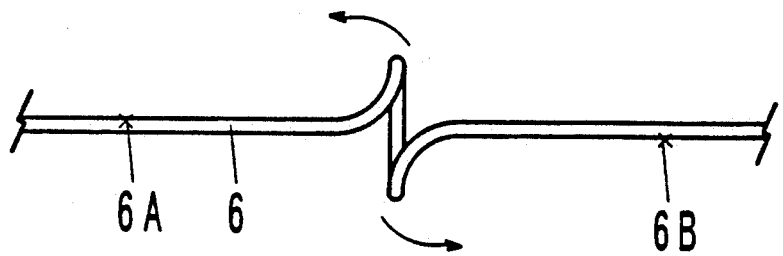
FIG. 18b is a plan view of the loop formed by the flexible tube 6 shown in FIG. 17b as it begins to open under tension.

Referring to FIG. 15, a flexible tube 6 is initially held in its horizontal position by supporting it at points 6A and 6B which are spaced apart by a distance of 75 cm. As shown in side elevation in FIG. 16 and in plan view in FIG. 16b, a loop L having a relatively large radius is formed in the flexible tube 6. Subsequently, as shown in side elevation in FIG. 17a and in plan view in FIG. 17b, a tensile stress acting in the horizontal direction is then applied to the flexible tube 6. To reduce the radius of the loop in the gradual manner, eventually a point is reached as illustrated in side elevation in FIG. 18a and in plan view in FIG. 18b, where a loop configuration cannot be maintained in the flexible tube 6, which then deforms into a distorted form. A radius r which the loop exhibits immediately before such distortion occurs is referred to as "loop relief radius". The thicker the strip plate 60, the harder the material of the strip plate 60 or the greater the diameter of the flexible tube, then the greater the loop relief radius r. In order to avoid a bending of the core rod 10 in excess of its permissible radius of curvature, it is preferred that a loop relief radius r be chosen which is equal to or greater than 15 mm.

Figure 19:
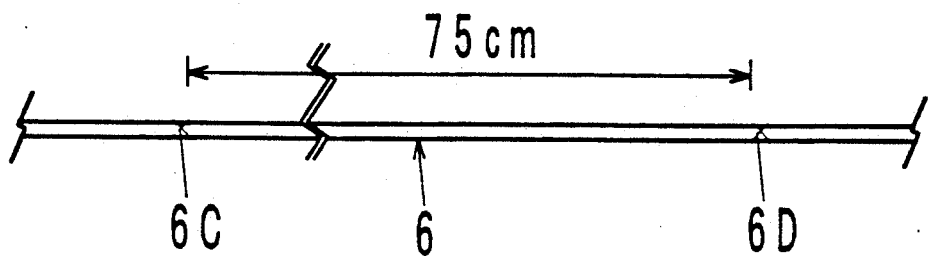
FIG. 19 is a side elevation of a tube used for the flexible tube 6 shown in FIG. 1.
Figure 20A:
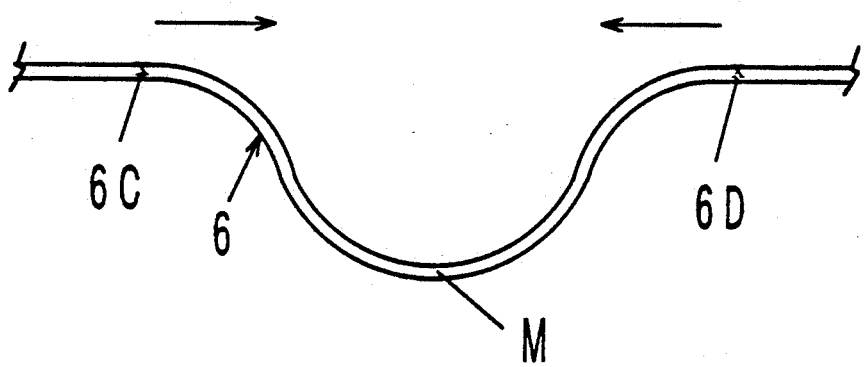
FIG. 20a is a side elevation of the flexible tube 6 shown in FIG. 19 as it is flexed by the application of an axial compression.
Figure 20B:
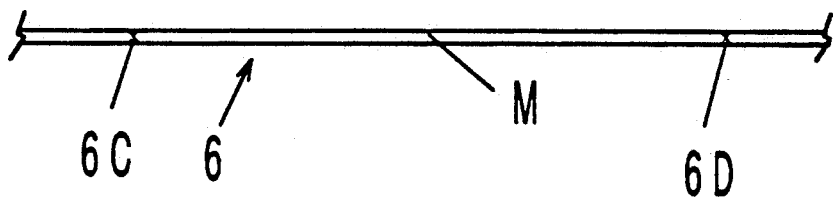
FIG. 20b is a plan view of the flexible tube 6 shown in FIG. 19 as it is flexed by the application of an axial compression.
Figure 21A:
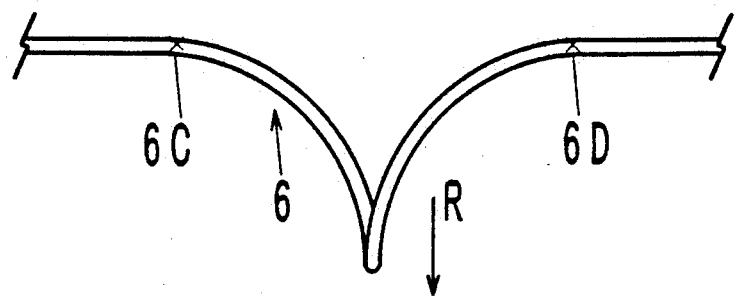
FIG. 21a is a side elevation of the flexible tube 6 shown in FIG. 20a as it begins to form a loop under compression.
Figure 21B:
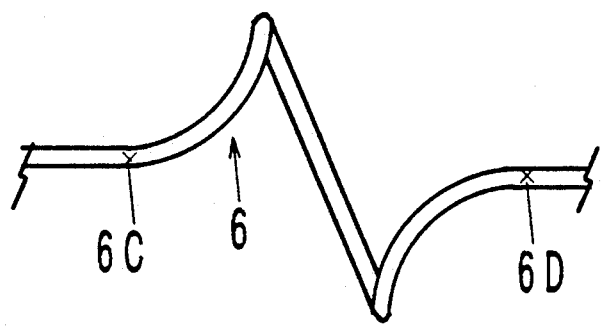
FIG. 21b is a plan view of the flexible tube 6 shown in FIG. 20b as it begins to form a loop under compression.
Figure 22A:
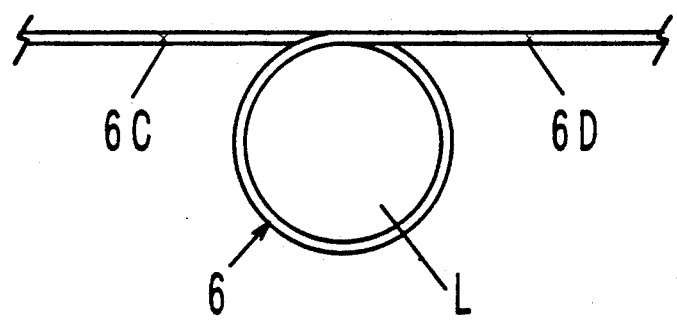
Figure 22B:
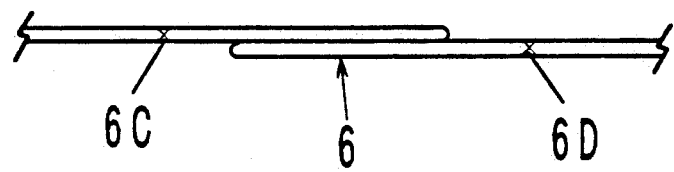
FIG. 22b is a plan view of a loop formed by the flexible tube 6 shown in FIG. 21b.

On the other hand, when a length of flexible tube 6 is held in a horizontal position by supporting it at points 6C and 6D which are spaced apart by a distance of 75 cm as illustrated in FIG. 19. As shown in side elevation in FIG. 20a and in plan view in FIG. 20b, when a compression is applied to the flexible tube 6 and the points 6C and 6D are moved toward each other in a gradual manner, the flexible tube 6 droops down into U configuration. Subsequently, the U-shaped section M will be twisted in a manner illustrated in side elevation in FIG. 21a and in plan view in FIG. 21b, and eventually the flexible tube 6 forms a loop L as shown in side elevation in FIG. 22a and in plan view in FIG. 22b. A radius of curvature R which the U-shaped section M presents when it is twisted 90° with respect to the direction in which the compression is applied is referred to as "loop forming radius". The thinner the thickness of the strip plate 60, the softer the material of the strip plate 60, the smaller the radius of the flexible tube 6 or the less the overlap between the first and the second annular end 65, 68, then the smaller the radius R into which the loop may be formed. The smaller the radius R into which the loop is formed, the higher the flexibility of the flexible tube 6, which is advantageously favored for distributing the flexible tube 6 throughout a box for wiring purpose. It is preferred that the radius R into which the loop may be formed be equal to or less than 200 mm.

Figure 23:
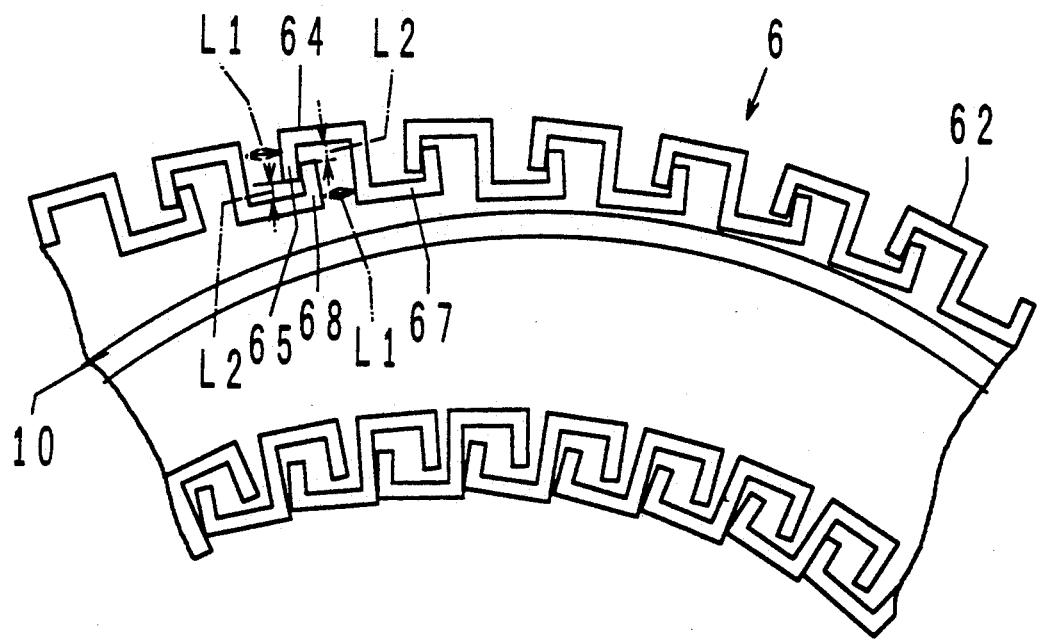
FIG. 23 is a longitudinal section, to an enlarged scale, of a tube used for the flexible tube 6 shown in FIG. 1 and a core rod contained therein as they are being bent.

The internal diameter of the flexible tube 6 is considerably large with respect to the external diameter of the optical fiber core assembly 10, allowing the core assembly 10 to move relatively freely within the tube 6. Because the profiled member 61 (FIG. 14) from which the flexible tube 6 is formed tends to restore itself from the helical configuration into a straight form, such tendency results in an axial tensile stress acting upon the flexible tube 6, which causes the tube 6 to straighten itself. When no external constraint is applied to the flexible tube 6, the first and the second annular end 65, 68 are in contact with each other as illustrated in FIG. 13b, so that the tube will shrink upon application of an axial compression, but will not exhibit any elongation upon application of a tension. When a bending effort is applied to the flexible tube 6, it will be bent in a manner illustrated in FIG. 23, but the first and the second annular end 65, 68 will strongly press against each other on the outside of the bending line while they will be relatively freed away from each other on the inside of the bending line, with consequence that there is no elongation on the outside, but there occurs a shrinkage on the inside of the tube 6. This means that an overall length of the tube 6 will remain substantially unchanged, and since the internal diameter of the tube 6 is considerably greater than the external diameter of the core assembly 10, it follows that the core assembly 10 located within the tube 6 is not substantially subject to any tensile effect.

Several examples of the flexible tube clad optical fiber cable 19B will be shown below.

(1)

Flexible tube 6:
  An internal diameter of 3.0 mm and an external diameter of 4.6 mm. The strip plate 60 is 0.2 mm thick stainless steel.
  Loop relief radius r: 34 mm
  Loop forming radius R: 131 mm
Optical fiber core rod 10:
  A quartz glass optical fiber core rod 9 has a core diameter of 50 μm and a cladding having an external diameter of 125 μm, and is provided with a resin coating to present an external diameter of 250 μm.

(2)

Flexible tube 6:
  An internal diameter of 3.0 mm and an external diameter of 4.6 mm. The strip plate 60 is 0.2 mm thick stainless steel.
  Loop relief radius r: 34 mm
  Loop forming radius R: 131 mm
Optical fiber core assembly 10:
  A quartz glass optical fiber core rod 9 has a core diameter of 50 μm and a cladding having an external diameter of 125 μm, and is provided with a resin coating to present an external diameter of 150 μm, and is additionally provided with a PV coating to present an external diameter of 0.35 mm.

(3)

Flexible tube 6:
  An internal diameter of 3.0 mm and an external diameter of 4.6 mm. The strip plate 60 is 0.2 mm thick stainless steel. PE coating 3b is applied to the surface of the tube to present an external diameter of 5.0 mm.
  Loop relief radius r: 47 mm
  Loop forming radius R: 163 mm
Optical fiber core assembly 10:
  A quartz glass optical fiber core rod 9 has a core diameter of 50 μm and a cladding having an external diameter of 120 μm, and is provided with a primary coating to present an external diameter of 250 μm.

Several examples of a combination cable comprising adaptor 5, seamless tube clad optical fiber cable 19A and flexible tube clad optical fiber cable 19B as shown in FIGS. 1 to 5 and 9a will be shown below.

(4)

Seamless tube clad optical fiber cable 19A:
  A welded stainless steel (SUS 304) tube is subject to an annealing process to provide an even structure and is then stretched into a seamless tube 6 having an external diameter of 1.0 mm and a thickness of 0.15 mm to which 1 mm thick PV coating 3a is applied.
Flexible tube clad optical fiber cable 19B:
Flexible tube 6:
  An internal diameter of 3.6 mm and an external diameter of 4.6 mm. The strip plate 60 is 0.8 mm thick stainless steel (SUS 304).
  Loop relief radius r: 34 mm
  Loop forming radius R: 131 mm
Optical fiber core assembly 10:
  A quartz glass optical fiber core rod 9 has a core diameter of 50 μm and a cladding having an external diameter of 125 μm, and is provided with a resin coating to present an external diameter of 250 μm.
Adaptor 5: Stainless steel (SUS 304)

(5)

Seamless tube clad optical fiber cable 19A:
  A welded stainless steel (SUS304) tube is subject to an annealing process to provide an even structure, and is then stretched into a seamless tube 4 having an external diameter of 1.0 mm and a thickness of 0.15 mm, to which 1 mm thick PV coating 3A is applied.
Flexible tube clad optical fiber cable 19B:
Flexible tube 6:
  An internal diameter of 3.0 mm and an external diameter of 4.6 mm. The strip plate 60 is 0.8 mm thick stainless steel (SUS 304). PE coating 3b is applied to the tube surface to present an external diameter of 5.0 mm.
  Loop relief radius r: 47 mm
  Loop forming radius R: 163 mm
Optical fiber core assembly 10:
  A quartz glass optical fiber core rod 9 has a core diameter of 50 μm and a cladding to present an external diameter of 125 μm, and is provided with a resin coating to present an external diameter of 250 μm.
Adaptor 5: Stainless steel (SUS 304)

A combination cable illustrated in FIGS. 1 to 5 and 9a and comprising the adaptor 5, the seamless tube clad optical fiber cable 19A and the flexible tube clad optical fiber cable 19B presents the advantages of the seamless tube clad optical fiber cable 19A where the wiring takes place over a relatively long distance, including the high strength, reduced diameter, reduced weight and high level of hermetic seal which assures its capability to bear the high load during the cable laying operation while simultaneously assuring the mechanical strength, erosion resistance and sealability after the cable has been laid on one hand, and also presents the advantages of the flexible tube clad optical fiber cable 19B where it is connected with a connector and is laid out over a relatively short distance, including the high flexibility and the high mechanical strength, which facilitates its connection with an optical communication equipment or other cable while assuring the cable strength at the juncture on the other hand. Since the optical fiber core assembly 10 is not in close contact with the inner wall of the metal tubes 4, 6 in either the seamless tube clad or the flexible tube clad optical fiber cable 19A, 19B, any lateral pressure applied to the metal tubes 4, 6 cannot cause a damage of the core assembly 10 unless the metal tubes 4, 6 are crashed. As long as the loop relief radius r of the metal tubes 4, 6 is designed to be equal to or greater than the permissible bending radius of the core assembly 10, no excessive bending occurs during a cable handling to cause a damage or fracture of the core assembly 10.

While preferred embodiments of the invention have been illustrated and described, it is to be understood that there is no intention to limit the invention to the precise constructions disclosed herein and the right is reserved to all changes and modifications coming within the scope of the invention as defined in the appended claims.

What is claimed is:

1. A metal tube clad optical fiber cable comprising:
  an equipment adaptor for coupling to an optical communication equipment;
  an optical fiber cable including a metal tube and an optical fiber core rod extending therethrough;
  a ferrule for supporting an end of the core rod located outside of an end of the metal tube to guide the end of the core rod into an optical fiber receiving opening in the equipment adaptor;
  a spring member for urging the ferrule in a direction to pass through the equipment adaptor;
  a base having one end fixedly connected to the equipment adaptor for supporting the ferrule to be movable in said direction;
  and a cable connector having one end fixedly connected to the other end of the base and its other end fixedly connected to the metal tube of the optical fiber cable;
  at least one of the base and ferrule or the cable connector being formed of an insulator.

2. A metal tube clad optical fiber cable according to claim 1 in which the base and the ferrule are formed of an insulator while the cable connector comprises a fixing metal nut having one end threadably engaged with the base and a metal cable adaptor having one end threadably engaged with the other end of the fixing nut and having its other end fixedly connected to the metal tube.

3. A metal tube clad optical fiber cable according to claim 1 in which the base and the ferrule are formed of a metal while the cable connector comprises a fixing nut of an insulator having one end threadably engaged with the base, and a cable adaptor of a metal having one end threadably engaged with the other end of the fixing nut and having its other end fixedly connected to the metal tube.

4. A metal tube clad optical fiber cable according to claim 1 in which the base and the ferrule are formed of a metal while the cable connector comprises a fixing nut of a metal having one end threadably engaged with the base, and a cable adaptor of an insulator having one end threadably engaged with the other end of the fixing nut and having its other end fixedly connected to the metal tube.

5. A metal tube clad optical fiber cable according to claim 1 in which the base and the ferrule are formed of a metal while the cable connector comprises a cable adaptor of an insulator having one end threadably engaged with the base and its other end fixedly connected to the metal tube.

6. A metal tube clad optical fiber cable according to claim 1 in which the metal tube of the optical fiber cable comprises a helical winding of a metal strip which is substantially S-shaped in section to provide an inwardly open annular groove formed inside the tube and an outwardly open annular groove formed outside the tube as well as an annular end extending toward the axis of the tube and an annular end extending away from the axis of the tube, the helical winding being such that when a first, a second and a third consecutive block, each corresponding to one helical pitch, are considered, the annular end of the first block which extends away from the axis is received in the inwardly open annular groove of the second block, the outwardly open annular groove of which receives the annular end of the third block which extends toward the axis of the tube to form an intermeshing engagement of successive blocks to provide a flexible tube.

7. A metal tube clad optical fiber cable comprising:
an equipment adaptor for coupling to an optical communication equipment;
a first optical fiber cable including a flexible metal tube and an optical fiber core rod passing therethrough;
a ferrule for supporting an end of the core rod which is located outside of an end of the flexible metal tube for guiding it into an optical fiber receiving opening formed in the equipment adaptor;
a spring member for urging the ferrule in a direction to extend through the equipment adaptor;
a base having one end fixedly connected to the equipment adaptor for supporting the ferrule to be movable in said direction;
a cable connector having one end fixedly connected to the other end of the base and its other end fixedly connected to said end of the flexible metal tube of the first optical fiber cable;
a relay adaptor having one end fixedly connected to the other end of the flexible metal tube of the first optical fiber cable and including a central opening through which the core rod extending through the metal tube extends;
and a second optical fiber cable including a seamless metal tube having one end fixedly connected to the other end of the relay adaptor and an optical fiber core rod passing therethrough which is continuous with the first mentioned optical fiber core rod passing through the flexible metal tube.

8. A metal tube clad optical fiber cable according to claim 7 in which the flexible metal tube of the first optical fiber cable comprises a helical winding of a metal strip which is substantially S-shaped in cross section to provide an inwardly open annular groove formed inside the tube and an outwardly open annular groove formed outside the tube as well as an annular end extending toward the axis of the tube and an annular end extending away from the axis of the tube, the helical winding being such that when a first, a second and a third consecutive block, each corresponding to one helical pitch are considered, the annular end of the first block which extends away from the axis is received in the inwardly open annular groove of the second block, the outwardly open annular groove of which receives the annular end of the third block which extend toward the axis of the tube to form an intermeshing engagement of successive blocks to provide a flexible tube.

9. A metal tube clad optical fiber cable comprising:
an equipment adaptor for coupling to an optical communication equipment;
an optical fiber cable including a metal tube and an optical fiber core rod extending therethrough;
a ferrule for supporting an end of the optical fiber core rod which is located outside of an end of the metal tube and for guiding such end of the core rod into an optical fiber receiving opening formed in the equipment adaptor;
a spring member for urging the ferrule in a direction to extend through the equipment adaptor;
a base having one end fixedly connected to the equipment adaptor for supporting the ferrule so as to be movable in said direction;
a fixing nut having one end fixedly connected to the other end of the base and including a caulking sleeve which extends in said direction and through which the optical fiber core rod extends;
and a cable adaptor having one end fixedly connected to the fixing nut and the other end fixedly connected to the metal tube of the optical fiber cable.

10. A metal tube clad optical fiber cable according to claim 9 in which at least one of the base and the ferrule, the fixing nut or the cable adaptor is formed of an insulator.

11. A metal tube clad optical fiber cable according to claim 9 in which the base and the ferrule are formed of an insulator while the fixing nut includes a threaded portion threadably engaging the base, the threaded portion and the sleeve being integrally formed of a metal.

12. A metal tube clad optical fiber cable according to claim 9 in which the metal tube of the optical fiber cable comprises a helical winding of a metal strip which is substantially S-shaped in cross section to provide an inwardly open annular groove and an outwardly open annular groove as well as an annular end extending toward the axis of the tube and an annular end extending away from the axis of the tube, the helical winding being such that when a first, a second and a third consecutive block, each corresponding to one helical pitch, are considered, the annular end of the first block which extends away from the axis of the tube is received in the inwardly open annular groove of the second block, the outwardly open annular groove of which receives the annular end of the third block which extends toward the axis of the tube, thus forming an intermeshing engagement of successive blocks to provide a flexible tube.

13. A metal tube clad optical fiber cable comprising:
an equipment adaptor for coupling to an optical communication equipment;
an optical fiber cable including a metal tube and an optical fiber core rod extending therethrough;
a ferrule for supporting an end of the optical fiber core rod which is located outside of an end of the metal tube and for guiding such end of the core rod into an optical fiber receiving opening formed in the equipment adaptor;
a spring member for urging the ferrule in a direction to extend through the equipment adaptor;
a base having one end fixedly connected to the equipment adaptor for supporting the ferrule to be movable in said direction;
and a fixing nut having one end fixedly connected to the other end of the base and including a caulking sleeve which extends in said direction and through which the optical fiber core rod extends, the sleeve being fixedly connected to the metal tube of the optical fiber cable.

14. A metal tube clad optical fiber cable according to claim 13 in which the base and the ferrule are formed of an insulator while the fixing nut includes a threaded portion threadably engaging the base, the threaded portion and the sleeve being integrally formed of a metal.

15. A metal tube clad optical fiber cable according to claim 13 in which the fixing nut comprises a threaded portion formed of an insulator and threadably engaging the base and a metal sleeve fixedly connected to the threaded portion.

16. A metal tube clad optical fiber cable according to claim 13 in which the metal tube of the optical fiber cable comprises a seamless metal tube.

17. A metal tube clad optical fiber cable comprising:
an optical fiber cable including a metal tube and an optical fiber core rod extending therethrough;
a plug frame including a forward opening, a rear opening, an internal space communicating with the bath openings and an inner flange projecting into the inner space;
a ferrule including an outer flange disposed for abutment against the inner flange and a central opening through which the optical fiber core rod of the optical fiber cable extends, the ferrule for supporting an end of the core rod which is located outside of the metal tube, the ferrule extending through a central opening defined by the inner flange in a direction from the rear opening toward the forward opening;
a coiled compression spring having one end disposed in abutment against the ferrule for urging the ferrule in a direction from the rear opening toward the forward opening;
and a stop ring including a forward end coupled to the rear end of the plug frame and providing an abutment for the other end of the coiled compression spring, a rear end having an opening of a relative large diameter in which an end of the optical fiber cable is connected, and a central opening which extends from the opening formed in the rear end to the forward end and through which the core rod of the optical fiber cable extends.

18. A metal tube clad optical fiber cable according to claim 17 in which the stop ring includes an engaging projection and a locking projection which project outwardly from the outer peripheral surface thereof at the forward end while the plug frame includes an engaging opening in which the engaging projection is fitted and an elongate slot continuing to the rear opening and for receiving the locking projection to guide a movement thereof in a direction from the rear opening toward the forward opening while blocking a rotation of the locking projection about the axis of the stop ring.

19. A metal tube clad optical fiber cable according to claim 17 in which the stop ring includes an engaging projection which projects outwardly from the outer peripheral surface thereof at its forward end, and a guide groove extending from the front end face in a direction in which the central opening extends while the plug frame includes an engaging slot in which the engaging projection is fitted and a locking projection projecting into the inner space and fitted in the guide groove to have its movement guided by the direction in which the guide groove extends while its rotation about the axis of the stop ring is blocked.

20. A metal tube clad optical fiber cable according to claim 17 in which the metal tube of the optical fiber cable comprises a helical winding of a metal strip which is substantially S-shaped in cross section to provide an inwardly open annular groove and an outwardly open annular groove as well as an annular end extending toward the axis of the tube and an annular end extending away from the axis of the tube, the helical winding being such that when a first, a second and a third consecutive block, each corresponding to one helical pitch, are considered, the annular end of the first block which extends away from the axis of the tube is received in the inwardly open annular groove of the second block, the outwardly open annular groove of which receives the annular end of the third block which extends toward the axis of the tube, thus providing an intermeshing engagement between the successive blocks to provide a flexible tube.

21. A metal tube clad optical fiber cable comprising:
a first optical fiber cable including a flexible metal tube and an optical fiber core rod passing therethrough;
a plug frame including a forward opening, a rear opening, an inner space communicating with the both openings and an inner flange projecting into the inner space;
a ferrule including an outer flange disposed for abutment against the inner flange, and a central opening through which the core rod of the first optical fiber cable extends, the ferrule for supporting an end of the core rod located outside an end of the flexible metal tube, the ferrule extending through a central opening defined by the inner flange in a direction from the gear opening toward the forward opening;
a coiled compression spring having one end which abuts against the ferrule for urging the ferrule in a direction from the rear opening toward the forward opening;
a stop ring including a forward end coupled to the rear end of the plug frame and providing an abutment for the other end of the coiled compression spring, a rear end having an opening of a relative large diameter therein in which an end of the first optical fiber cable is connected and a central opening extending from said opening in the rear end and continuing to the forward end and through which the core rod of the first optical fiber cable extends;
a relay adaptor having one end fixedly connected to the other end of the flexible metal tube of the first optical fiber cable and including a central opening through which the core rod extending through the metal tube extends;
and a second optical fiber cable including a seamless metal tube having one end fixedly connected to the other end of the relay adaptor and an optical fiber core rod extending therethrough which is a continuation of the first optical fiber core rod passing through the flexible metal tube.

22. A metal tube clad optical fiber cable according to claim 21 in which the flexible metal tube of the first optical fiber cable comprises a helical winding of a metal strip which is substantially S-shaped in cross section to provide an inwardly open annular groove and an outwardly open annular groove as well as an annular end which extends toward the axis of the tube and an annular end which extends away from the axis of the tube, the helical winding being such that when a first, a second and a third consecutive block, each corresponding to one helical pitch, are considered, the annular end of the first block which extends away from the axis of the tube is received in the inwardly open annular groove of the second block, the outwardly open annular groove of which receives the annular end of the third block which extends toward the axis of the tube, thus producing an intermeshing chain of successive blocks to produce a flexible tube.

23. A metal tube clad optical fiber cable comprising a flexible tube, and an optical fiber core rod extending therethrough, the flexible tube comprising a helical winding of a metal strip which is substantially S-shaped in cross section to provide an inwardly open annular groove and an outwardly open annular groove as well as an annular end which extends toward the axis of the tube and an annular end which extends away from the axis of the tube, the helical winding being such that when a first, a second and a third consecutive block, each corresponding to one helical pitch, are considered, the annular end of the first block which extends away from the axis of the tube is received in the inwardly open annular ring of the second block, the outwardly open annular groove of which receives the annular end of the third block which extends toward the axis of the tube, thus providing an intermeshing chain of blocks to produce the flexible tube.

24. A metal tube clad optical fiber cable comprising:
a first optical fiber cable including a flexible tube, and an optical fiber core rod disposed within the flexible tube, the flexible tube comprising a helical winding of a metal strip which is substantially S-shaped in cross section to provide an inwardly open annular groove and an outwardly open annular groove as well as an annular end which extends toward the exit of the tube and an annular end which extends away from the axis of the tube, the helical winding being such that when a first, a second and a third consecutive block, each corresponding to one helical pitch, are considered, the annular end of the first block which extends away from the axis of the tube is received in the inwardly open annular groove of the second block, the outwardly open annular groove of which receives the annular end of the third block which extends toward the axis of the tube, thus providing an intermeshing chain of blocks to prude the flexible tube;
a relay adaptor having one end fixedly connected to the other end of the flexible metal tube of the first optical fiber cable and including a central opening through which the core rod extending through the metal tube extends;
and a second optical fiber cable including a seamless metal tube having one end fixedly connected to the other end of the relay adaptor and an optical fiber core rod extruding therethrough which is a continuation of the first optical fiber core rod.

* * * * *